United States Patent
Chickering

(10) Patent No.: US 7,324,981 B2
(45) Date of Patent: Jan. 29, 2008

(54) SYSTEM AND METHOD OF EMPLOYING EFFICIENT OPERATORS FOR BAYESIAN NETWORK SEARCH

(75) Inventor: David Maxwell Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 10/147,620

(22) Filed: May 16, 2002

(65) Prior Publication Data

US 2003/0220906 A1    Nov. 27, 2003

(51) Int. Cl.
*G06N 5/00* (2006.01)

(52) U.S. Cl. .............................. 706/45; 701/50; 707/3; 707/5

(58) Field of Classification Search ................. 706/45, 706/50; 435/6; 382/104; 707/3, 5; 701/50
See application file for complete search history.

(56) References Cited

U.S. PATENT DOCUMENTS

| | | | |
|---|---|---|---|
| 5,832,182 A * | 11/1998 | Zhang et al. ................. | 706/50 |
| 6,221,592 B1 * | 4/2001 | Schwartz et al. .............. | 435/6 |
| 6,363,161 B2 * | 3/2002 | Laumeyer et al. .......... | 382/104 |
| 6,411,952 B1 * | 6/2002 | Bharat et al. ................. | 707/5 |
| 6,453,056 B2 * | 9/2002 | Laumeyer et al. .......... | 382/104 |
| 6,934,615 B2 * | 8/2005 | Flann et al. .................. | 701/50 |
| 6,947,927 B2 * | 9/2005 | Chaudhuri et al. ............ | 707/3 |

OTHER PUBLICATIONS

Chickering, David Maxwell, Learning Equivalence Classes of Bayesian Network Structures, Proceedings of the Thirteenth National Conference on Uncertainty in Artificial Intelligence, 1996, Portland, OR, pp. 150-157, Morgan Kaufmann.*

Chickering, David Maxwell, Learning Equivalence Classes of Bayesian-Network Structures, Journal of Machine Learning Research, vol. 2, pp. 445-498, Feb. 2002.*

Paul Munteanu, et al., "Efficient Score-Based Learning of Equivalence Classes of Bayesian Networks", PKDD 2000, LNAI 1910, pp. 96-105.

C. K. Chow, et al., Approximating Discrete Probability Distributions with Dependence Trees, IEEE Transactions on Information Theory, vol. IT-14, No. 3, May 1968, pp. 462-467.

Joe Suzuki, "An Extension of Learning Bayesian Belief Networks Based on MDL Principle", Osaka University, p. 232. *Proceedings of the Ninth Conference on Uncertainty in Artificial Intelligence*, 1993.

(Continued)

*Primary Examiner*—Wilbert L Starks, Jr.
(74) *Attorney, Agent, or Firm*—Amin, Turocy & Calvin, LLP

(57) ABSTRACT

Methods and systems are disclosed for learning Bayesian networks. The approach is based on specifying a search space that enables searching over equivalence classes of the Bayesian network. A set of one or more operators are applied to a representation of the equivalence class. A suitable search algorithm searches in the search space by scoring the operators locally with a decomposable scoring criteria. To facilitate application of the operators and associated scoring, validity tests can be performed to determine whether a given operator is valid relative to the current state representation.

68 Claims, 10 Drawing Sheets

OTHER PUBLICATIONS

David M. Chickering, et al., "Learning Bayesian Networks: Search Methods and Experimental Results", 17 pages. In *Proceedings of the Fifth International Workshop on Artificial and Statistics*, 1995.

Judea Pearl, et al., "A Theory of Inferred Causation", This paper is a modified version of one presented at the Second International Conference conference on the Principles of Knowledge Representation and Reasoning, Apr. 1991, 12 pages.

Marek J. Druzdzel, et al., "Causality in Bayesian Belief Networks", In *Proceedings of the Ninth Annual Conference on Uncertainty in Artificial Intelligence (UAI-93)*, pp. 3-11, Morgan Kaufman Publishers, Inc., 1993.

Dan Geiger, et al., "Stratified Exponential Families: Graphical Models and Model Selection", Technical Report MSR-TR-98-31, Jul. 1998, pp. 1-30.

Gregory F. Cooper, et al., "A Bayesian Method for the Induction of Probabilistic Networks from Data", Machine Learning, 9, 1992; pp. 309-347.

David Maxwell Chickering, "Learning Equivalence Classes of Bayesian Network Structures", University of California at Los Angeles, Technical Report MSR-TR-2001-65, 2001.

Steven B. Gillispie, et al., "Enumerating Markov Equivalence Classes of Acyclic Digraph Models", University of Washington, 7 pages, *Proceedings of the Seventeenth Conference on Uncertainty in Artificial Intelligenece*, 2001.

Denver Dash, et al., "A Hybrid Anytime Algorithm for the Construction of Casual Models From Sparse Data", In *Proceedings of the Fifteenth Annual Conference on Uncertainty in Artificial Intelligence (UAI-99)*, pp. 142-149, Morgan Kaufman Publishers, Inc., 1999.

Wray Buntine, "Theory Refinement on Bayesian Networks", from *Uncertainty in Artificial Intelligence, Proceedings of*, 1991, pp. 52-60.

Remco R. Bouckaert, "Probalistic Network Construction Using the Minimum Description Length Principle", Utrecht University, Jul. 1994; pp. 1-23.

David Heckerman, et al., "Decision-Theoretic Foundations for Causal Reasoning", Journal of Artificial Intelligence Research 3 (1995), pp. 405-430.

Peter Spirtes, et al., "Learning Bayesian Networks with Discrete Variables from Data", Carnegie Mellon University, *Proceedings of the First International Conference on Knowledge Discovery and Data Mining*, pp. 294-299, AAAI Press.

David Maxwell Chickering, "Learning Bayesian Networks is NP-Complete", University of California at Los Angeles, *Learning from Data: Artificial Intelligence and Statistics V*, pp. 121-130. Springer-Verlag, 1996.

David Maxwell Chickering, "A Transformational Characterization of Equivalent Bayesian Network Structures", University of California at Los Angeles, 18 pages, *Proceedings of the Eleventh Conference on Uncertainty in Artificial Intelligence*, 1995.

Tomás Kocka, et al., "On Inclusion Problem", Feb. 12, 2001, pp. 1-38. Technical Report 2010, Academy of Sciences of the Czech Republic, Institute of Information Theory and Automation.

Chris Meek, "Causal Inference and Causal Explanation with Background Knowledge", Dec. 23, 1997, pp. 1-19.

Ross D. Shachter, Bayes-Ball: The Rational Pastime (for Determining Irrelevance and Requisite Information in Belief Networks and Influence Diagrams), Stanford University, 9 pages. In *Proceedings of the Fourteenth Conference on Uncertainty in Artificial Intelligence*, Aug. 1998.

Tomás Kocka, et al., "On Characterizing Inclusion of Bayesian Networks", *Proceedings of the Seventeenth Conference on Uncertainty in Artificial Intelligence*, pp. 261-268, 2001.

David Heckerman, et al., "Learning Bayesian Networks: The Combination of Knowledge and Statistical Data", *Machine Learning* Feb. 1995, pp. 1-53.

Wray Buntine, "A Guide to the Literature on Learning Probabilistic Networks from Data", IEEE, 8:195-210, 1996.

Steen A Andersson, et al., "A Characterization of Markov Equivalence Classes for Acyclic Digraphs", Indiana University and University of Washington, *Annals of Statistics*, 25:505-541, 1997.

David Heckerman, et al., "A Tutorial on Learning With Bayesian Networks", Technical Report MSR-TR-95-06, Mar. 1995 (Revised Nov. 1996) pp. 1-57.

David Maxwell Chickering, "Learning Equivalence Classes of Bayesian-Network Structures", Journal of Machine Learning Research 2 (2002) pp. 445-498. Submitted Jul. 2001; Published Feb. 2002.

Judea Pearl, "Probablistic Reasoning in Intelligent Systems: Networks of Plausible Inference", (revised second printing) 1988.

Sir Harold Jeffreys, "Theory of Probability" (third edition) 1961.

Peter Spirtes, et al., "Causation, Prediction, and Search" (search edition), 2000.

Michael I. Jordan, "Learning in Graphical Models", 1998.

\* cited by examiner

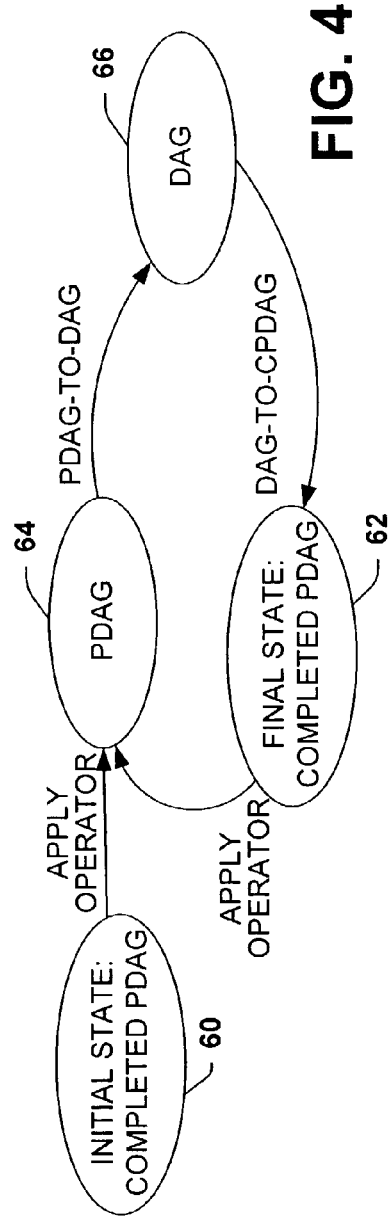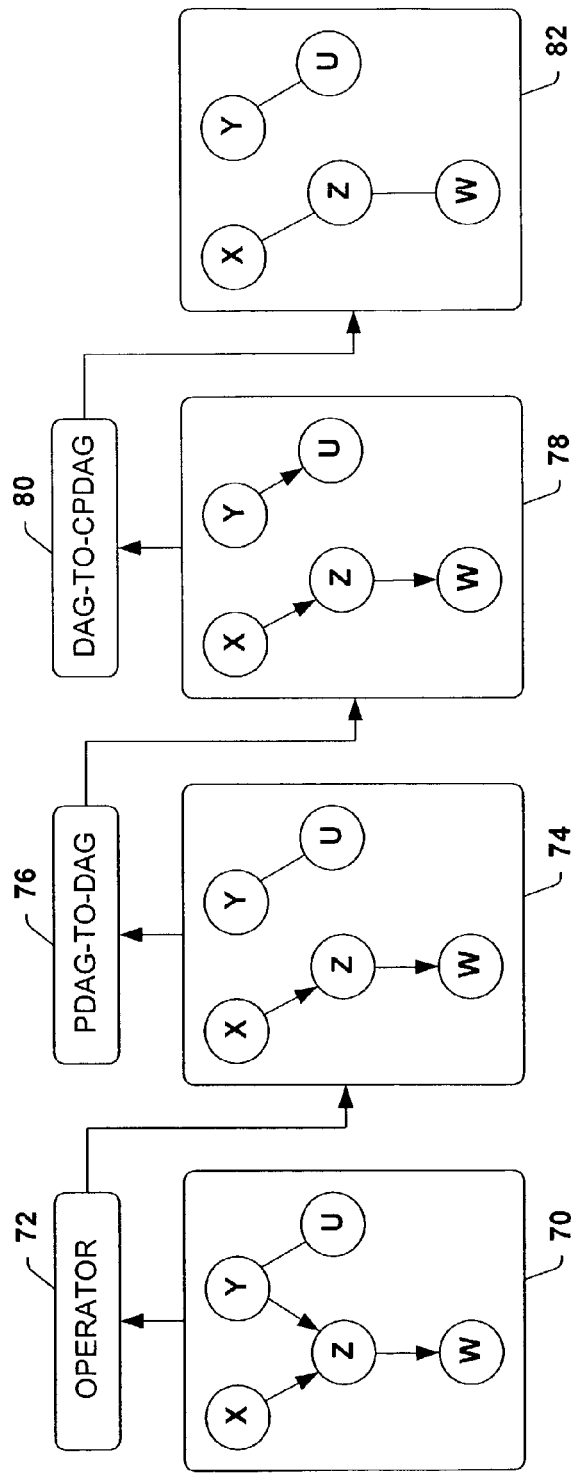
FIG. 4
FIG. 5

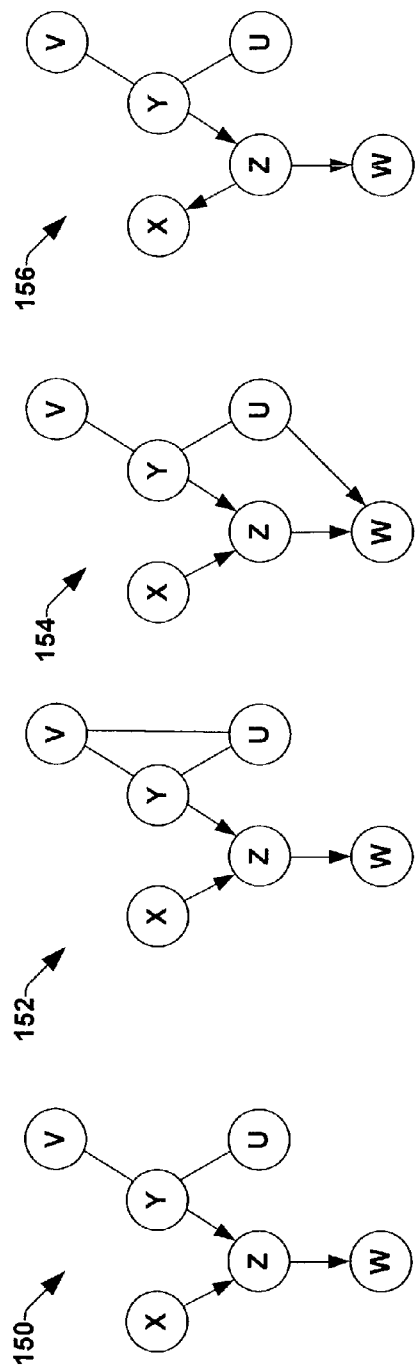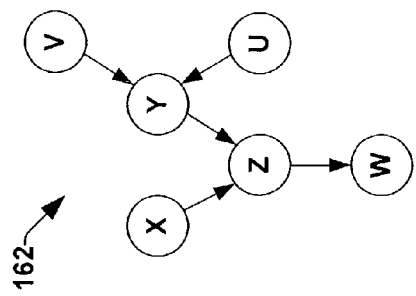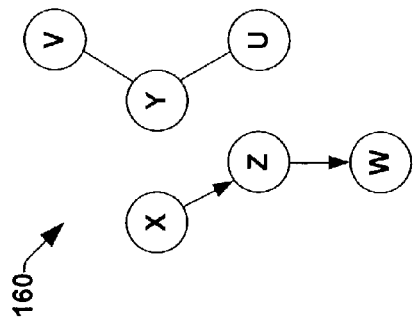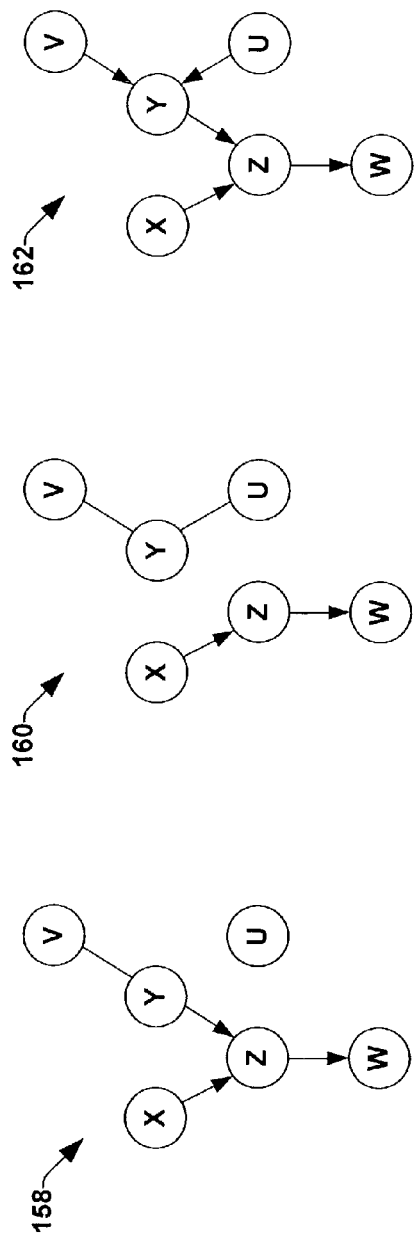

SYSTEM AND METHOD OF EMPLOYING EFFICIENT OPERATORS FOR BAYESIAN NETWORK SEARCH

TECHNICAL FIELD

The present invention relates generally to data modeling and analysis, and more particularly to an efficient approach for learning Bayesian networks.

BACKGROUND

The development and use of data analysis tools has been steadily increasing to help gain a greater understanding of information and relationships between different aspects of information. In e-commerce and other Internet and non-Internet applications, for example, databases are generated and maintained that have large amounts of information. Such information often is analyzed, or "mined," to learn additional information regarding customers, users, products, etc.

One particular area relating to decision theory in which there is significant amount of research is Bayesian networks. A Bayesian network is a representation of the probabilistic relationships among distinctions about the world. Each distinction, sometimes called a variable, can take on one of a mutually exclusive and exhaustive set of possible states. By way of illustration, a Bayesian network can be represented as a directed graph where the variables correspond to nodes and the relationships (e.g., dependencies) between the nodes correspond to arcs connecting various nodes. When there is an edge between two nodes, the probability distribution of the first node depends upon the value of the second node when the direction of the edge points from the second node to the first node. The absence of edges in a Bayesian network conveys conditional independencies. However, two variables indirectly connected through intermediate variables are said to be conditionally dependent given lack of knowledge of the values ("states") of the intermediate variables.

The variables in a Bayesian network can be discrete or continuous. A discrete variable is a variable that has a finite or countable number of states, whereas a continuous variable is a variable that has an infinite number of states. An example of a discrete variable is a Boolean variable. Such a variable can assume only one of two states: (e.g., "true" or "false"). An example of a continuous variable is a variable that may assume any real value between −1 and 1. Discrete variables have an associated probability distribution. Continuous variables, however, have an associated probability density function ("density").

Over the last decade, the Bayesian network has become a popular representation for encoding uncertain expert knowledge in expert systems. More recently, researchers have developed methods for learning Bayesian networks from data. The techniques that have been developed are new and still evolving, but they have been shown to be effective for some data-analysis problems.

The learning problem can be considered a classic heuristic-search problem: given a Bayesian network structure, there is a "score" that measures how well that structure fits with the data. The task is to utilize a search algorithm to find a good structure; typically, once a good structure has been identified, it is straight-forward to estimate the corresponding conditional probability distributions. Traditional approaches to learning Bayesian networks usually perform a greedy search though DAG space.

For example, in a conventional approach, the structure of a Bayesian network is a directed acyclic graph (DAG), and at each step of the learning process one considers (1) adding, (2) deleting, or (3) reversing an edge in the DAG. Typically, the process begins with a DAG containing no edges, and greedily performs these three operators until a local maximum is reached. However, many DAGs correspond to the same statistical model. Consider an example domain of two variables X and Y. A Bayesian network with structure X→Y (i.e. a directed edge from X to Y) can model all probability distributions where X and Y are dependent, as can the network structure X→Y. Thus, it is stated that these two models are equivalent. In contrast, a model with no edge between X and Y can only model those distributions where X and Y are independent.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to systems and methods to efficiently learn Bayesian networks. The approach is based on specifying a search space that facilitates searching over equivalence classes of Bayesian network structures. The search space includes a set of one or more operators (e.g., a plurality) that can be applied to a state representation of the equivalence class to transform it to a next state. A suitable search algorithm (e.g., any heuristic search algorithm) searches the state by scoring the operators locally with a decomposable scoring criteria. The local scoring, for example, can be computed as a function of nodes defined in the current state.

To facilitate application of the operators and associated scoring, validity tests can be performed to determine whether a given operator is valid relative to the current state representation. The validity tests can be implemented by validity conditions (e.g., that are necessary and sufficient conditions for that operator to be valid) associated with each of the operators in the search space. An operator is valid, for example, if it (when applied to the state) does, in fact, result in a PDAG that admits a consistent extension. Otherwise the operator is invalid. The validity conditions can also be employed to generate a set of candidate operators for use in searching a given state representation.

In accordance with a particular aspect of the present invention, the state representation in the search space corresponds to an equivalence-class representation, such as a completed Partially Directed Acyclic Graph (PDAG). Because application of an operator may result in a PDAG that is not complete, it may be desirable to convert the resulting PDAG into a completed PDAG, such as by employing a transformation algorithm.

To the accomplishment of the foregoing and related ends, certain illustrative aspects of the invention are described herein in connection with the following description and the annexed drawings. These aspects are indicative, however, of a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 4 is an example of a state diagram illustrating state transitions from an initial state to a final state in accordance with an aspect of the present invention.

FIG. 5 is an example of PDAG.

FIG. 7A is an example of a state representation that can be operated on in accordance with an aspect of the present invention.

FIGS. 7B-7G illustrate examples of state representations resulting from application of different operators on the initial state of FIG. 7A in accordance with an aspect of the present invention.

DESCRIPTION OF THE INVENTION

The present invention relates generally to systems and methods to efficiently learn Bayesian networks. The approach is based on specifying a search space that enables searching over equivalence classes of the Bayesian network. A set of one or more operators are applied to a representation of the equivalence class. A suitable search algorithm searches in the search space by scoring the operators locally with a decomposable scoring criteria. To facilitate application of the operators and associated scoring, validity tests can be performed to determine whether a given operator is valid relative to the current state representation. Thus, scoring can be limited to valid operators so as to further improve efficiency of the search.

Nomenclature and Definitions

Throughout the Description of the Invention, a variable is denoted by an upper case letter (e.g., A, $B_i$, Y, $\Theta$) and a state or value of that variable by the same letter but in lower case (e.g., a, $b_i$, y, $\theta$). A set of variables are denoted by a bold-face capitalized letter or letters (e.g., X, $Pa_i$, $Na_{i,j}$). A corresponding bold-face lower-case letter or letters (e.g., x, $pa_i$, $na_{i,j}$) is used to denote an assignment of state or value to each variable in a given set. Italicized letters (Greek and English; e.g., G, B, $\epsilon$) denote statistical models (both parameterized and not parameterized).

Also throughout this Description numerous comparisons are made among statistical models. To simplify the discussion, it is to be assumed that when any such comparison is made, the models are defined over the same set of variables, unless specified otherwise.

Basic System for Learning Bayesian Networks

Figure 1:
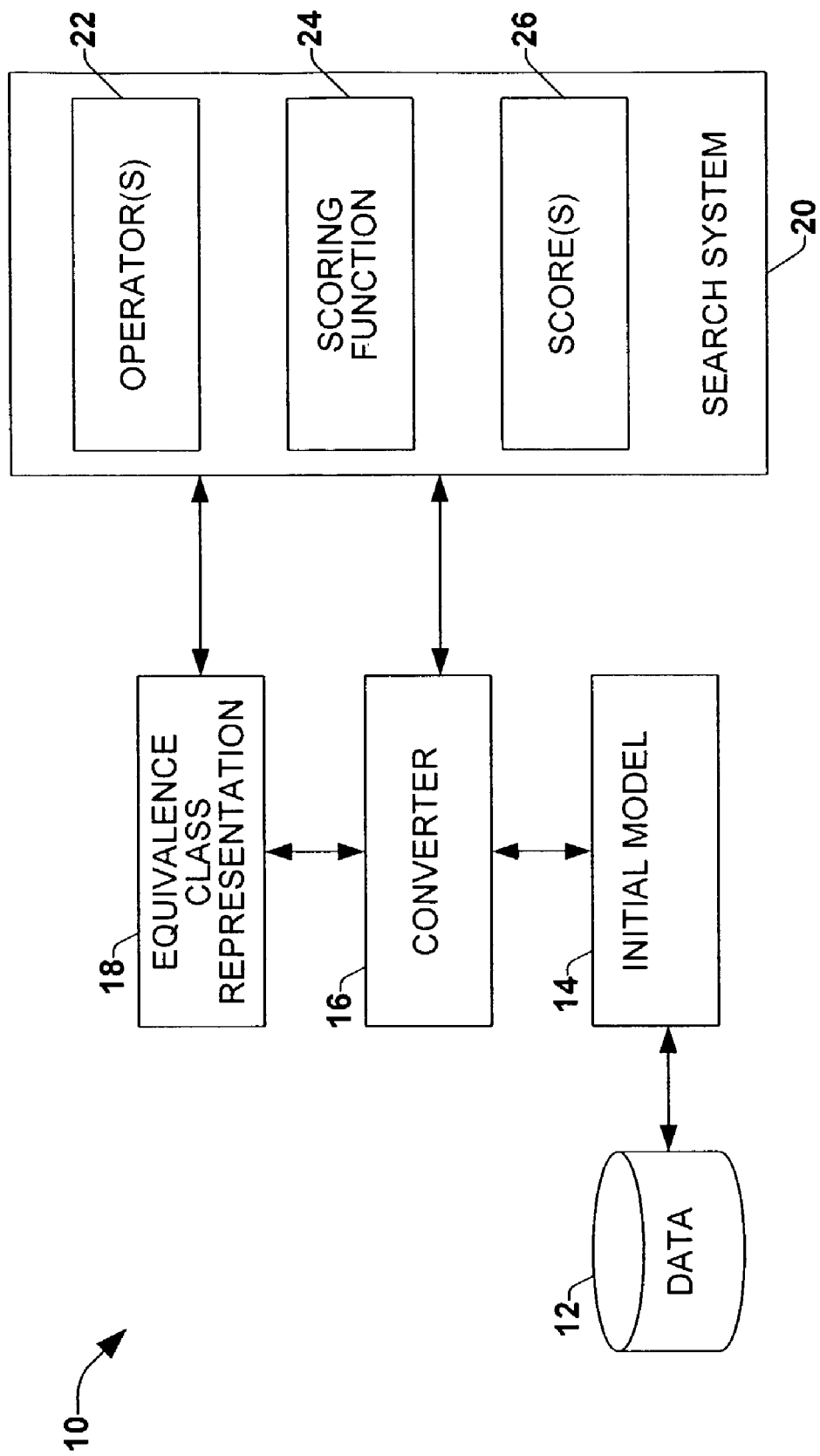
FIG. 1 is a block diagram illustrating an example of a system for learning a Bayesian network in accordance with an aspect of the present invention.

FIG. 1 illustrates a system 10 that can be employed to learn a Bayesian network in accordance with an aspect of the present invention. While the resulting network structure is called a "Bayesian network" (e.g., a Directed Acyclic Graph or DAG), it is to be understood that neither the process for searching nor scoring the model are required to employ a Bayesian statistical approach. Those skilled in the art will understand and appreciate various approaches and search techniques that can be employed to learn a Bayesian network, in accordance with an aspect of the present invention, based on the description contained within this document.

The system 10 includes data 12 based on which a Bayesian network model (e.g., a DAG) is to be constructed according to an aspect of the present invention. The learning begins with an initial model 14, such as can be represented by one or more nodes corresponding to variables corresponding to the data domain defined by the data 12. At first, for example, the initial model 14 may include no edges interconnecting the nodes. Those skilled in the art will understand and appreciate other initial model configurations that can be utilized to construct a model in accordance with an aspect of the present invention, such as a reasonable approximation based on data domain. For example, a knowledge engineer can define the initial model 14 from the data 12, based on empirical data and/or expert knowledge for the domain for which the model applies.

The system 10 can also include a converter 16 operative to convert the initial model 14 into a corresponding equivalence class representation 18. The converter 16 constructs the equivalence class representation or state from a class of Bayesian-network structures. By way of example, completed PDAGs (Partially Directed Acyclic Graphs) are used to represent the state 18 in equivalence space (E-space). It is to be appreciated that an initial model having nodes and no edges is generic and provides a useful starting point in most circumstances and for most data domains.

Two DAGs are said to be equivalent if they impose the same set of independence constraints among the variables. The "equivalence" relation for DAG models is reflexive (e.g., a DAG is equivalent to itself), symmetric (e.g., if A is equivalent to B, then B is equivalent to A), and transitive (e.g., if A is equivalent to B and B is equivalent to C, then A is equivalent to C), and consequently it defines a set of equivalence classes over DAG models. In other words, the set of all DAG models defined over the same set of variables can be partitioned into distinct sets, such that all of the DAGs within a particular set are equivalent to each other and thus form an equivalence class.

As described in below in a section entitled General Background and Nomenclature for Model Equivalence, two DAGs A and B are equivalent to each other if and only if (1) they have the same skeleton and (2) they have the same set of v-structures. From (1), it follows that for any edge X→Y in some DAG A, if B is equivalent to A then either X→Y is in B or Y→X is in B. When an edge X→Y in DAG A appears in the same direction for every DAG equivalent to A, we say that X→Y is compelled in A; otherwise, we say that X→Y is reversible in A. By definition, an edge that is compelled (reversible) in some DAG is compelled (reversible) in every DAG in the same equivalence class. Accordingly, it can be stated that an edge is compelled or reversible in an equivalence class.

By way of background, a PDAG corresponds to graph, which can be used to represent equivalence classes of DAGs, that can have both directed and undirected edges, but no directed cycles (e.g., it is acyclic). Given a PDAG P, a DAG G is called a consistent extension of P if G and P have the same skeleton and set of v-structures as P. If there exists any such G, we say that P admits a consistent extension. A completed PDAG is a special type of PDAG, which also can be used to represent equivalence classes of DAGs, in which directed edges correspond to compelled edges in the equivalence class and undirected edges correspond to reversible edges in the equivalence class. Algorithms, such as described herein, can be used to efficiently convert from a PDAG to a DAG as well as from a DAG to a completed PDAG. As described in greater detail below, it is demonstrated that using completed PDAGs for the representation 18 instead of general PDAGs (or DAGs in the case of B-space) substantially eliminates the problem of having multiple representations for the same equivalence class. While in practice some operators may result in a non-completed PDAG, conversion to its completed form is generally straightforward by applying a defined algorithm. Thus, application of an operator to a completed PDAG can be considered to result in a completed PDAG according to an aspect of the present invention.

The system 10 also includes a search system 20 that searches the state representation 18 in equivalence space for changes that produce a local maximum (e.g., the model having the highest score among all neighbor states). The searching can include any heuristic search technique. For example, the search system 20 can employ a greedy search, a best first search, a limited discrepancy search, simulated annealing, or other search algorithm. The search system 20 includes a set of one or more operators 22 that can be applied to the state representation 18 to produce a state change or state transformation. A scoring function 24 is associated with the operators 22 to compute a score 26 for respective operators. The scoring function 24 utilizes a decomposable scoring criteria tat also provides score equivalence in E-space. As used herein, a scoring function is called score equivalent if it assigns the same score to all of the DAGs in the same equivalence class. Those skilled in the art will understand and appreciate that systems and method according to the present invention are particularly useful when searching for DAG models (or equivalence classes of DAG models) using a scoring criterion that is both decomposable and score equivalent. Examples of decomposable, score-equivalent scoring functions 24 include versions of the Minimum Descriptive Length (MDL) approach the Bayesian Information Criterion (BIC), and many Bayesian scoring criteria, although other such scoring functions also could be utilized in accordance with an aspect of the present invention.

The scoring function 24 can include local functions to compute scores for each of the respective operators 22. For example, a score can be computed locally for each operator, such as identifying an increase in local score corresponding to application of the respective operator. The local scoring can be performed for an adjacency set of one or more nodes directly or indirectly affected by application of the respective operator. It is to be appreciated that different operators may have different adjacency sets. Advantageously, the scoring function 24 can be applied locally relative to the state representation 18 prior to actually applying the respective operators 22. By using a decomposable scoring criterion that evaluates respective operators locally (e.g., using local functions of the nodes in the representation 18), only the affected nodes (e.g., that define the adjacency set) need be considered. This helps improve efficiency in the search process since search algorithms can traverse through equivalence classes faster than conventional algorithms.

The scoring function 24 can compute scores 26 for all operators 22 or to a selected subset of the operators according to their potential impact on the current state representation 18. To further improve efficiency associated with searching, the search system 20 can limit application of the scoring function 24 to only a subset of valid operators 22 according to an aspect of the present invention. The operator 22 that provides the highest score 26 for the current state representation 18 thus can be applied to the current state to provide a next state representation for use in subsequent searching.

In accordance with an aspect of the present invention, each search operator can transform a completed PDAG P into another completed PDAG Q as follows. First, one or more of the edges in P is modified (e.g., added, deleted, directed, reversed, undirected). The resulting structure P' is a PDAG that is not necessarily completed. If P' admits a consistent extension G, then the operator is valid, and the resulting state Q is the completed PDAG representation for the equivalence class to which G belongs. It will be appreciated that any consistent extension of P' must necessarily belong to the same equivalence class, and thus the operator is well defined. Otherwise, if P' does not admit a consistent extension, then the operator is invalid and it is not be considered by the search algorithm.

Thus, if an operator 22 does not admit a consistent extension, it is invalid for the current representation 18 and need not be scored. For example, if a DAG G has the same skeleton and the same set of v-structures as a PDAG P and if every directed edge in P has the same orientation in G, then G is a consistent extension of P. To help ensure only application of valid operators 22 and, in turn, improve efficiency, appropriate validity tests can be performed for each operator as a condition precedent to the scoring criteria scoring a respective operator on the current state. In this way, if an operator 22 is invalid, no scoring needs to be performed for that operator.

In other situations, validity might be postponed until after attempted application of the operator according to an aspect of the present invention. To confirm validity (or invalidity) of an operator, for example, the search system 20 can first make the modification to a completed PDAG that defines a non-empty equivalence class, and then employ one or more algorithms to (1) convert the resulting PDAG to a corresponding DAG and (2) build a completed PDAG from the corresponding DAG. The resulting completed PDAG can be evaluated as part of the validity test to discern whether application of the operator on the representation 18 admits a consistent extension. It is to be appreciated that the converter 16 can convert the resulting PDAG state representation into DAG space, and from DAG space into equivalence class space even if the resulting state is a completed PDAG, thereby eliminating the need to test whether the result is a completed PDAG.

Those skilled in the art will understand and appreciate that the foregoing approach is in contrast to traditional approaches to learning Bayesian networks. For example, the present approach efficiently searches through the set of equivalence classes of DAGs, as opposed to the more traditional approach of searching through individual DAGs.

In a particular aspect of the present invention, the searching is performed using a decomposable and score-equivalent scoring function. For example, in the conventional approach, the structure of a Bayesian network is a directed acyclic graph (DAG), and at each step of the process one considers (1) adding, (2) deleting, or (3) reversing an edge. Typically, the process begins with a DAG containing no edges, and greedily performs these three operators until a local maximum is reached. However, many DAGs correspond to the same statistical model. Consider an example domain of two variables X and Y. A Bayesian network with structure X→Y (a directed edge from X to Y) can model all probability distributions where X and Y are dependent. However, the network structure X←Y can also model the same distributions, so it can be said that these two models are equivalent. (The model with no edge between X and Y can only model those distributions where X and Y are independent).

Accordingly, as mentioned above, the system 10 provides an efficient approach to search through equivalence classes of DAGs (e.g., represented as completed PDAGs in equivalence space), as opposed to DAGs themselves. The system 10 employs the set of one or more operators 22 that can be applied to the equivalence class structure to search through equivalence classes by scoring with a decomposable scoring function implemented by the scoring mechanism 26. In accordance with a particular aspect of the present invention, the scoring function also is score equivalent, as described herein. The result is that the system 10 can compute the increase in score that results from applying an operator very efficiently. A more detailed discussion of the underlying theory associated with searching and scoring follows.

In view of the basic approach for learning a model described above, with respect to FIG. 1, other possible implementations, background and some theory behind this approach will be better appreciated upon consideration of the following description.

General Background and Nomenclature for Model Equivalence

The structure G of a Bayesian network imposes a set of independence constraints, which hold in any distribution that can be represented by a network with that structure. In particular, it can be shown that a Bayesian network imposes the constraint that each node is independent of its non-descendants given its parents.

A parameterized Bayesian-network model B for a set of variables $U=\{X_1, \ldots, X_n\}$ is a pair $(G, \theta)$, where $\theta$ is a set of parameter values that specify all of the conditional probability distributions. $G=(V, E)$ is a directed acyclic graph-or DAG for short-consisting of (1) nodes V in one-to-one correspondence with the variables U, and (2) directed edges E that connect the nodes. The notation $\theta_i \subset \theta$ is used to denote the subset of these parameters that define the conditional probability of node $X_1$ given its parents in G. A parameterized Bayesian network represents a joint distribution over U that factors according to the structure G, for example, as follows:

$$p_B(X_1 = x_1, \ldots, X_n = x_n) = \prod_{i=1}^{n} p(X_i = x_i | Pa_i^G = pa_i^G, \theta_i) \quad (1)$$

where $Pa_1^G$ is the set of parents of node $x_1$ in G.

The structure G of a Bayesian network is itself a model that represents the independence constraints that hold in any distribution that can be represented by a Bayesian network with that structure. The set of all independence constraints imposed by the structure G via Equation 1 can be characterized by Markov conditions, which are the constraints that each variable is independent of its non-descendants given its parents.

There are two general types of equivalence; namely, distributional equivalence and independence equivalence. Two DAGs G and G' are distributionally equivalent if for every Bayesian network $B=(G, \theta)$, there exists a Bayesian network $B'=(G', \theta)$ such that B and B' define the same probability distribution, and vice versa. Two DAGs G and G' are independence equivalent if the independence constraints in the two DAGs are identical. In most applications of Bayesian networks, it is assumed that the conditional distribution for each node in the Bayesian-network model comes from some specific family of distributions.

For example, the conditional probability of each continuous variable can be assumed to be a sigmoid distribution. Such distributional assumptions can sometimes impose non-independence constraints on the joint distribution that lead to DAGs that are independence equivalent but not distributionally equivalent. Unless specified otherwise herein, it is to be understood that the common distribution assumptions apply, such as can be found in various literature on Bayesian-network learning. Thus, to simplify discussions it is assumed that Gaussian distributions are used for continuous variables and unconstrained multinomial distributions are used for discrete variables. Under these assumptions, the two notions of equivalence can be considered identical. Thus, it can be stated that two DAGs G and G' are equivalent to indicate that they are both distributionally and independence equivalent.

The representation G≈G' is used to denote that G and G' are equivalent. Because this equivalence is reflexive, symmetric, and transitive, the relation defines a set of equivalence classes over network structures. The term $\epsilon$ is used to denote an equivalence class of DAG models. Note that the non-bold character $\epsilon$ is used, although arguably misleading in light of our convention to use boldface for sets of variables. The non-bold character is used to emphasize the interpretation of $\epsilon$ as a model for a set of independence constraints as opposed to a set of DAGs. However, the set-containment operator denotes DAG-elements of an equivalence class. Thus, we write G∈$\epsilon$ to denote that G is in equivalence class $\epsilon$. In some cases, $\epsilon(G)$ may be used to denote a particular equivalence class to which a DAG model G belongs. Note that G≈G' implies G'∈$\epsilon(G)$ and G'∈$\epsilon(G')$.

The skeleton of any DAG is the undirected graph resulting from ignoring the directionality of every edge. A v-structure in DAG G is an ordered triple of nodes (X, Y, Z) such that (1) G contains the edges X→Y and Z→Y, and (2) X and Z are not adjacent in G.

In a paper entitled, *Equivalence and synthesis of causal models*, In Proceedings of the Sixth Conference on Uncertainty in Artificial Intelligence, pages 220-227 (1990) by. T S Verma and Judea Pearl, it was found that two DAGs are equivalent if and only if they have the same skeletons and the same v-structures. It follows that for any DAG G=(V, E), an edge X→Y∈E is covered in G if X and Y have identical parents, with the exception that X is not a parent of itself. That is, X→Y is covered in G if $Pa_Y^G = Pa_X^G \cup X$.

The significance of covered edges is evident from the following result, which was presented in *A transformational characterization of Bayesian network structures*, by David Maxwell Chickering, Proceedings of the Eleventh Conference on Uncertainty in Artificial Intelligence, Montreal, Quebec, S. Hanks and P. Besnard, editors, published by Morgan Kaufmann (1995). In this paper, it was demonstrated that given any DAG model G, where G' is the result of reversing the edge X→Y in G, then G' is a DAG that is equivalent to G if and only if X→Y is covered in G. This paper further demonstrated a theorem describing a transformation characterization of equivalent DAG models. The theorem can be expressed:

Let G and G' be any pair of DAG models such that G≈G' and for which there are δ edges in G that have opposite orientation in G'. Then there exists a sequence of δ distinct edge reversals in G with the following properties:
1. Each edge reversed in G is covered
2. After each reversal, G is a DAG and G≈G'
3. After all reversals G=G'

A DAG H is an independence map of a DAG G if every independence relationship in H holds in G. The expression G≦H denoted that H is an independence map of G. The symbol '≦' is meant to express the fact that if G≦H then H contains more edges than does G.

An edge X→Y in G is compelled if that edge exists in every DAG that is equivalent to G. For example, from Verma and Pearl above, it follows that all edges in a v-structure are compelled. If an edge X→Y in G is not compelled, is considered reversible. In light of the above theorem, it will be appreciated that for any reversible edge X→Y in G, there exists a DAG G' equivalent to G in which the edge is oriented in the opposite direction (i.e. X←Y).

Thus, it is to be appreciated that the independence map relation can be utilized to compare any pair of models—not just DAG models—that impose independence constraints over a set of variables.

State Representation in Equivalence Class Space

In accordance with an aspect of the present invention, a model generator (e.g., the system 20 in FIG. 1) searches through equivalence classes of DAG models as opposed to DAG models themselves. As mentioned above, in particular, completed PDAGs (CPDAGs) can be employed to represent a state of a model in equivalence class space.

As mentioned in the previous section, a PDAG is an acyclic partially directed graph, which can be used to represent an equivalence class of DAGs. For example, let P denote an arbitrary PDAG. The equivalence class of DAGs∈(P) corresponding to P can be defined as follows: G∈∈(P) if and only if G and P have the same skeleton and the same set of v-structures.

From Verma and Pearl (described above), it follows that a PDAG containing a directed edge for every edge participating in a v-structure and an undirected edge for every other edge uniquely identifies an equivalence class of DAGs. There may be many other PDAGs, however, that correspond to the same equivalence class. For example, any DAG interpreted as a PDAG can be used to represent its own equivalence class. If a DAG G has the same skeleton and the same set of v-structures as a PDAG P and if every directed edge in P has the same orientation in G, then, as used herein, G is a consistent extension of P. Any DAG that is a consistent extension of P must also be contained in ∈(P), although not every DAG in ∈(P) is a consistent extension of P. If there is at least one consistent extension of a PDAG P, we say that P admits a consistent extension.

Figure 2C:
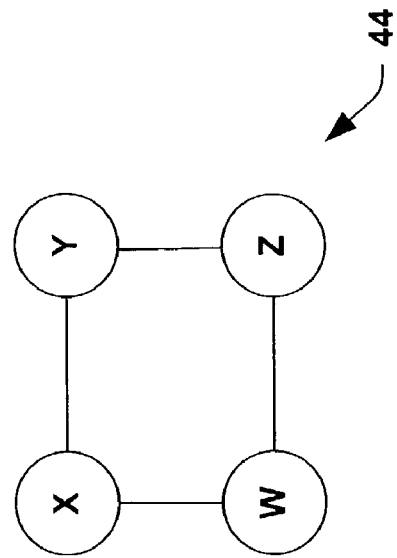
FIGS. 2A-2C are examples of graphs illustrating different types and configurations of PDAGs.
Figure 2B:
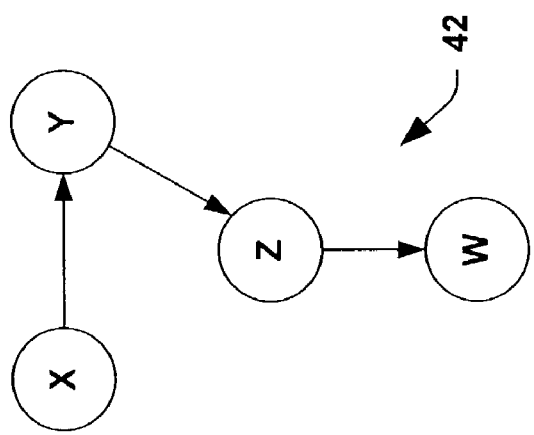
Figure 2A:
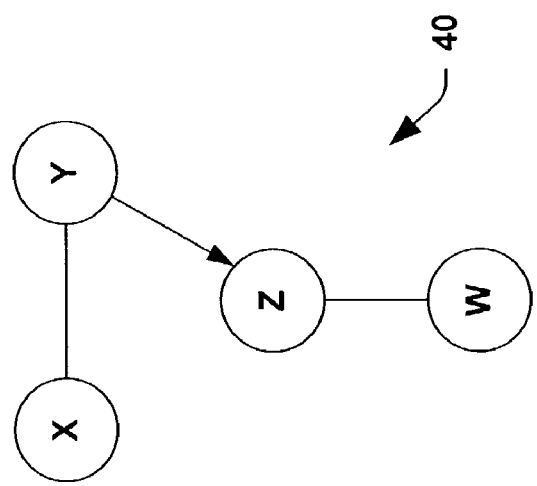

FIG. 2A illustrates an example of a PDAG 40 that admits a consistent extension, and FIG. 2B shows one example of a DAG 42 that is a consistent extension of the PDAG depicted in FIG. 2A. FIG. 2C illustrates an example of a PDAG 44 that does not admit a consistent extension.

Figure 3B:
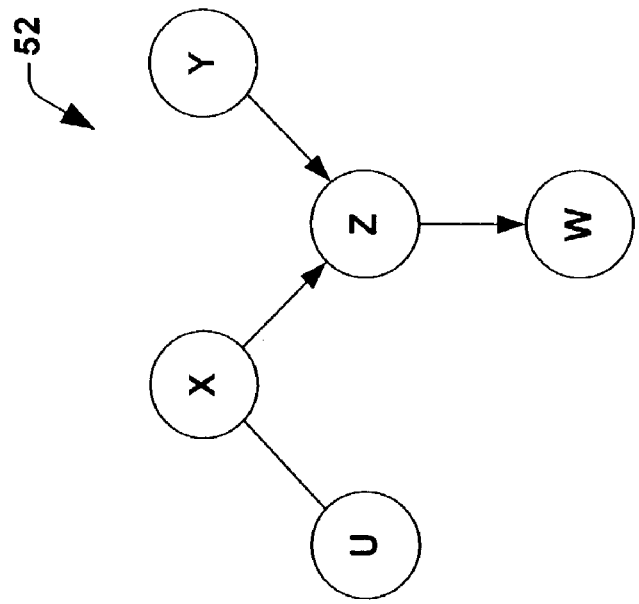
FIG. 3B is an example of a completed PDAG constructed from the DAG of FIG. 3A.
Figure 3A:
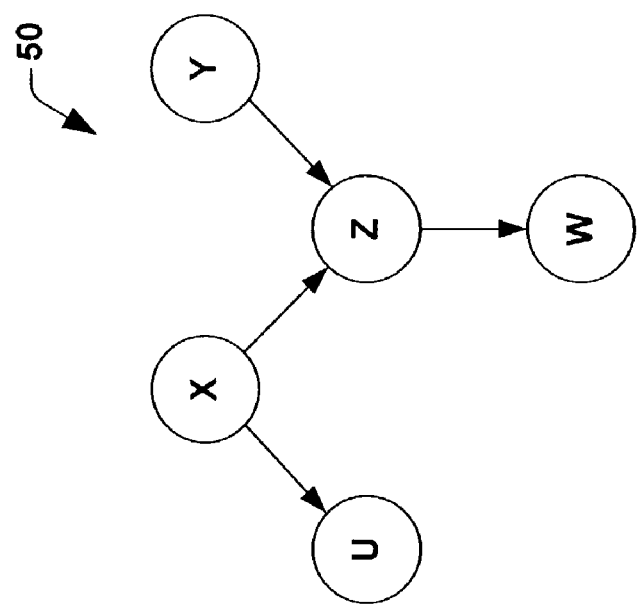
FIG. 3A is an example of DAG.

It will be appreciated that completed PDAGs can be used to represent equivalence classes of DAGs in accordance with an aspect of the present invention. Recall that a compelled edge is an edge that exists in the same orientation for every member of an equivalence class, and that a reversible edge is an edge that is not compelled. The completed PDAG corresponding to an equivalence class is the PDAG consisting of a directed edge for every compelled edge in the equivalence class, and an undirected edge for every reversible edge in the equivalence class. Thus, given an equivalence class of DAGs, the completed PDAG representation is unique. Also, every DAG in an equivalence class is a consistent extension of the completed PDAG representation for that class. FIG. 3A illustrates an example of a DAG G, indicated at 50, and FIG. 3B shows the completed PDAG 52 for ∈(G) derived from the DAG 50. The directed edges x→z, y→z and z→w (which are part of a v-structure) are all compelled and, therefore, remain in the completed PDAG 52.

Those skilled in the art will understand and appreciate that PDAGs have been called patterns (see, e.g., *Causation, Prediction, and Search*, by P. Spirtes, C. Glymour, and P. Scheines. Springer-Verlag, New York, (1993)) and that completed PDAGs have been called essential graphs (see, e.g. *A characterization of Markov equivalence classes for acyclic digraphs*, by Steen A. Andersson, David Madigan, and Michael D. Perlman, Annals of Statistics, 25:505-541 (1997)) as well as maximally oriented graphs (see e.g., *Causal inference and causal explanation with background knowledge*, by C. Meek, Proceedings of the Eleventh Conference on Uncertainty in Artificial Intelligence, S. Hanks and P. Besnard, editors, Montreal, Quebec, published by Morgan Kaufman (1995)).

Converting between DAGs and PDAGs

Because operators applied to a completed PDAG, in accordance with an aspect of the present invention, sometimes can result in non-complete PDAG (although still corresponding to a non-empty equivalence class), it may be desirable to convert the resulting state representation into a completed PDAG representation to facilitate additional searching in E-space. Two examples of algorithms that can be employed as part of a converter (e.g., converter 16 of FIG. 1) to provide a completed PDAG representation are a DAG-to-CPDAG and PDAG-to-DAG. Such algorithms also can be used to convert an initial model, which is not a CPDAG (e.g., it could be a PDAG or DAG), into a corresponding CPDAG representation.

The DAG-to-CPDAG algorithm takes as input a Bayesian-network structure, and outputs a completed PDAG representation of the equivalence class to which that structure belongs. Thus, this algorithm can be employed if the initial model is not a completed PDAG as well as if application of an operator to a current state results in a non-completed PDAG representation. The PDAG-to-DAG algorithm takes as input a PDAG representation for an equivalence class, and outputs a (DAG) member of that class.

It is to be understood and appreciated that the time needed for conversion is generally insignificant when compared to the time evaluating the score of adjacent states. Further, because local scores can be derived for all of the operators (or a subset of the valid operators, if desired), the conversion algorithms usually need only be applied when the search algorithm commits to moving to a given state. Furthermore, the complexities of the conversion algorithms depend only on the structural complexity (i.e. number of nodes and edges) of the graph, and not on the size of the data.

Many rule-based algorithms have been developed that can be used to implement DAG-to-CPDAG, all of which can be utilized in conjunction with a system and/or method according to an aspect the present invention. By way of example, Meek (1995) and Verma and Pearl (1992), both of which have been introduced above, present examples of suitable DAG-to-CPDAG algorithms. Andersson et al. (1997), also mentioned above, provides a similar rule-based algorithm, except that edges from a DAG are undirected by matching patterns of edges.

A computationally efficient alternative algorithm that can be used to implement DAG-to-CPDAG is now described. In particular, Chickering (1995) describes an algorithm that yields an implementation that is asymptotically optimal on average. The algorithm labels all of the edges in a DAG as either "compelled" or "reversible"; given such a labeling, it is straightforward to construct the corresponding completed PDAG. The functionality of such algorithm is set forth below, identified as "Label-Edges(G)." In general, the Label-Edges algorithm labels each edge in a DAG with "compelled" or "reversible", which facilitates an immediate implementation of DAG-to-CPDAG. The first step of the algorithm is to define a (particular) total ordering over the edges in the given DAG G. For purposes of simplicity, the ordering portion of the Label-Edges algorithm has been represented as a separate procedure set forth below in another algorithm labeled "Order-Edges(G)." To avoid confusion between ordered nodes and ordered edges, the terms "node" and "edge" have been capitalized in the algorithm. Because the Label-Edges and Order-Edges algoritbms are considered straightforward, a separate detailed description of their application is not provided herein.

Label-Edges (G)

1. Order the edges in G using Algorithm Order-Edges
2. Label every edge in G as "unknown"
3. While there are edges labeled "unknown" in G
4.   Let x → y be the lowest ordered edge that is labeled "unknown"
5.   For every edge w → x labeled "compelled"
6.     If w is not a parent of y
7.       Label x → y and every edge incident into y with "compelled"
8.       Go to 3
9.     Else
10.      Label w → x with "compelled"
11.  If there exists an edge z → y such that z ≠ x and z is not a parent of x
12.    Label x → y and all "unknown" edges incident into y with "compelled"
13.  Else
14.    Label x → y and all "unknown" edges incident into y with "reversible"

As introduced above, the following is an example of the Order-Edges algorithm that can be employed to produce an ordering over the edges in a DAG, such as in conjunction with the Label-Edges algorithm set forth above. The following algorithm receives as an input a DAG G and outputs a DAG G with a labeled order on its edges, thereby producing a total ordering over the edges in the DAG G.

Order-Edges(G)

1. Perform a topological sort on the NODES in G
2. Set i = 0
3. While there are unordered EDGES in G -continued 4.   Let y be the lowest ordered NODE that has an unordered EDGE incident into it
5.   Let x be the highest ordered NODE for which x → y is not ordered
6.   Label x → y with order i
7.   i = i + 1

A relatively simple implementation of PDAG-to-DAG will be appreciated with reference to *A simple algorithm to construct a consistent extension of a partially oriented graph*, by Dorit Dor and Michael Tarsi, Technical Report R-185, Cognitive Systems Laboratory, UCLA Computer Science Department, (1992). For example, $N_x$ and $\Pi_x$ are used to denote the set of neighbors and parents, respectively, of node x. Given a PDAG P, a DAG G can be created that contains all of the directed edges from P, and no other edges. The following procedure (or algorithm) can be repeated to perform such conversion: First, select a node x in P such that (1) x has no out-going edges, and (2) if $N_x$ is non-empty, then $N_x \cup \Pi_x$ is a clique. If P admits a consistent extension, the node x is guaranteed to exist. Next, for each undirected edge y-x incident to x in P, insert a directed edge y→x in G. Finally, remove x and all incident edges from the P and continue with the next node. The algorithm terminates when all nodes have been deleted from P.

A loose upper bound on the complexity of a simple implementation of this algorithm for a PDAG consisting of |V| nodes and |E| edges is now considered to ascertain time associated with implementing the algorithm. For each node $x_l$, one can determine if its neighbors and parents form a clique in $O(|N_{x_l} \cup \Pi_{x_l}|^2)$ time. For each edge that is removed, only the endpoints need to be checked to discern if their neighbors and parents now form a clique. For instance, if $N_z \cup \Pi_z$ is a clique for some node z in P, at any step of the algorithm, this set must remain a clique after each edge removal in the algorithm. Suppose, for example, that $|N_{x_l} \cup \Pi_{x_l}|$ is bounded above by some constant k, then the algorithm can be implemented in time $O(|V|k^2 + |E|k^2)$.

The acceptability of the upper bound just described may vary depending on the value of k relative to the number of variables in the domain. It will be appreciated, however, that if select $x_l$ is selected after discovering a clique among its neighbors and parents, then the algorithm results in every member of $N_{x_l} \cup \Pi_{x_l}$ being made a parent of $x_l$ in the DAG. Because the number of parameters in the local distribution of a discrete node grows exponentially with the number of parents, it is reasonable to expect the number of parents of such a node to be bounded by some reasonably small constant k. This can be enforced explicitly using the scoring function, or implicitly by the lack of data needed to support such a complex model. Given that an upper bound on the number of parents can be known, a clique among the neighbors and parents may not need to be ever checked unless the number of these nodes is less than k.

In practice, graphs encountered during search are reasonably sparse, and thus the time spent implementing this algorithm by the search procedure will generally be insignificant when compared to other more computationally intense portions of the search, such as scoring.

Example of Conversion Algorithms

As described in the previous section, to recover the completed PDAG resulting from application of an operator, one or more transformation algorithms can be employed to convert a DAG or PDAG to a completed PDAG representation in accordance with an aspect of the present invention.

FIGS. 4 and 5 and the following description present examples of a transformation algorithm that could be implemented to convert a PDAG, which results from application of an operator, to a completed PDAG representation in accordance with an aspect of the present invention. Those skilled in the art may understand and appreciate other methods of implementing suitable conversions to utilize desired operators in accordance with an aspect of the present invention.

FIG. 4 is a state diagram illustrating state transitions from an initial state 60 to a final state 62 in accordance with an aspect of the present invention. The initial state representation is depicted as a completed PDAG 60. The initial state 60 can correspond, for example, to a starting model (e.g. which may or may not have any edges) determined by a knowledge engineer or to a set of nodes representing variables for a given data domain with no edges. The state transitions from state 230 to a PDAG state 64 in response to application of an operator on the initials state. The operator, for example, can be any of the operators, such as described herein, as well as others that may be or have been developed by others skilled in the art. Such operator is designed to admit a consistent extension when applied to the representation 60. The resulting PDAG 64 may or may not be a completed PDAG, depending on the configuration of the initial state 230 and the particular operator applied to cause the transition.

From the PDAG state 64, which is not necessarily completed, an algorithm PDAG-to-DAG can be called to extract a consistent extension G from the PDAG 64, which corresponds to a DAG 66. If the PDAG 64 does not admit a consistent extension, then the given operator is not valid. It is to be appreciated that even in circumstances where the operator results in a completed PDAG at 64, the PDAG-to-DAG algorithm can still be utilized to extract a consistent extension from the resulting PDAG 64. In other situations, additional functionality could be implemented to discern whether the PDAG 64 is completed and, in turn, process it accordingly. To complete the application, the algorithm DAG-to-CPDAG is called with input G corresponding to the DAG 66 to build the resulting completed PDAG representation 62 from the DAG 66.

FIG. 5 illustrates a specific example of an initial completed PDAG 70 that is acted upon by an operator 72. In this example the PDAG includes five nodes that are interconnected, as shown in FIG. 5. The operator 72, for example, corresponds to a Delete U operator, which deletes the directed edge y→z to provide a PDAG 74. In this example, the resulting PDAG 74 is not completed. Those skilled in the art will understand and appreciate that other operators could result in a completed PDAG at 74.

A PDAG-to-DAG algorithm 76 is applied to the PDAG 74 to build a consistent extension thereof, namely, a DAG 78. In this example, the consistent extension is obtained by changing the undirected edge y-u to a directed edge y→u. Next, a DAG-to-CPDAG algorithm 80 is applied to the DAG 78 to build a corresponding completed PDAG 82. The completed PDAG 82 includes the same skeleton as the DAG 78, but no directed edges. This is because none of the directed edges in the DAG 78 are compelled.

It is to be appreciated that, the conversion algorithms 76, 78 do not depend on the number of records in the data. Also, because the conversion is applied relatively infrequently compared to the number of times operators are evaluated during a search, its contribution to the overall run time of the search is insignificant.

Heuristics for Searching with E-Space Operators

Given a scoring criterion for evaluating Bayesian-network structures, a typical learning algorithm, such as can be implemented in accordance with an aspect of the present invention, attempts to identify one or more structures that attain a high score by applying a heuristic search algorithm. This section presents an example of a search space that a heuristic search algorithm can employ in conjunction with a score-equivalent scoring criterion to search over equivalence classes of Bayesian network structures in accordance with an aspect of the present invention.

A typical search space has three components namely, a set of states, a representation scheme for the states and a set of operators that can be applied to transform to other states. The set of states represents the logical set of solutions to the search problem, the representation scheme defines an efficient way to represent the states, and the set of operators is used by the search algorithm to transform the representation of one state to another in order to traverse the space in a systematic way. Once the search space has been defined, any one of a number of well-known heuristic search algorithms can easily be applied to that space. In a relatively simple formulation of a search space for learning Bayesian networks, the states of the search are defined to be individual Bayesian networks, the representation of a state is simply a directed acyclic graph (DAG), and the operators are defined to be local changes to those graphs.

To understand the popularity of B-space among practitioners, it is to be appreciated that a Bayesian-network-structure scoring criterion S is decomposable if it can be written as a sum of measures, each of which is a function only of one node and its parents. In other words, a decomposable scoring criterion S applied to a DAG G can be expressed as a sum and/or product of its nodes and associated probability distributions at such nodes. For example, the scoring criterion can be expressed as:

$$S(G) = \sum_{i=1}^{n} s\left(x_i, \prod_{x_i}\right) \qquad (2)$$

where n is the number of nodes in G and $s(x_i, \Pi_{x_i})$ is a function only of x, and its parents in G.

Note that the data D is implicit in Equation 2. When it is stated that $s(x_i, \Pi_{x_i})$ is only a function of $x_i$ and its parents, it is to be understood and appreciated that this also means that the data on which this measure depends is restricted to those columns corresponding to $x_i$ and its parents. To be explicit, the terms in the sum of Equation 2 could be rewritten in a more complex manner, as follows:

$$s(x_i, D(\{x_i\}), \Pi_{x_i}, D(\Pi_{x_i})) \qquad (3)$$

where D(X) denotes the data restricted to the columns corresponding to the variables in set X.

As mentioned above, equivalence-class space (or E-space) is the search space for which the states of the search space are equivalence classes of Bayesian-network structures. Completed PDAGs are utilized to represent the states of the search in E-space. Using completed PDAGs instead of general PDAGs (or DAGs in the case of B-space) eliminates the problem of having multiple representations for the same equivalence class. E-space includes a set of one or more operators that can be applied to completed PDAGs.

First Example of E-Space Search System and Operators

Figure 6:
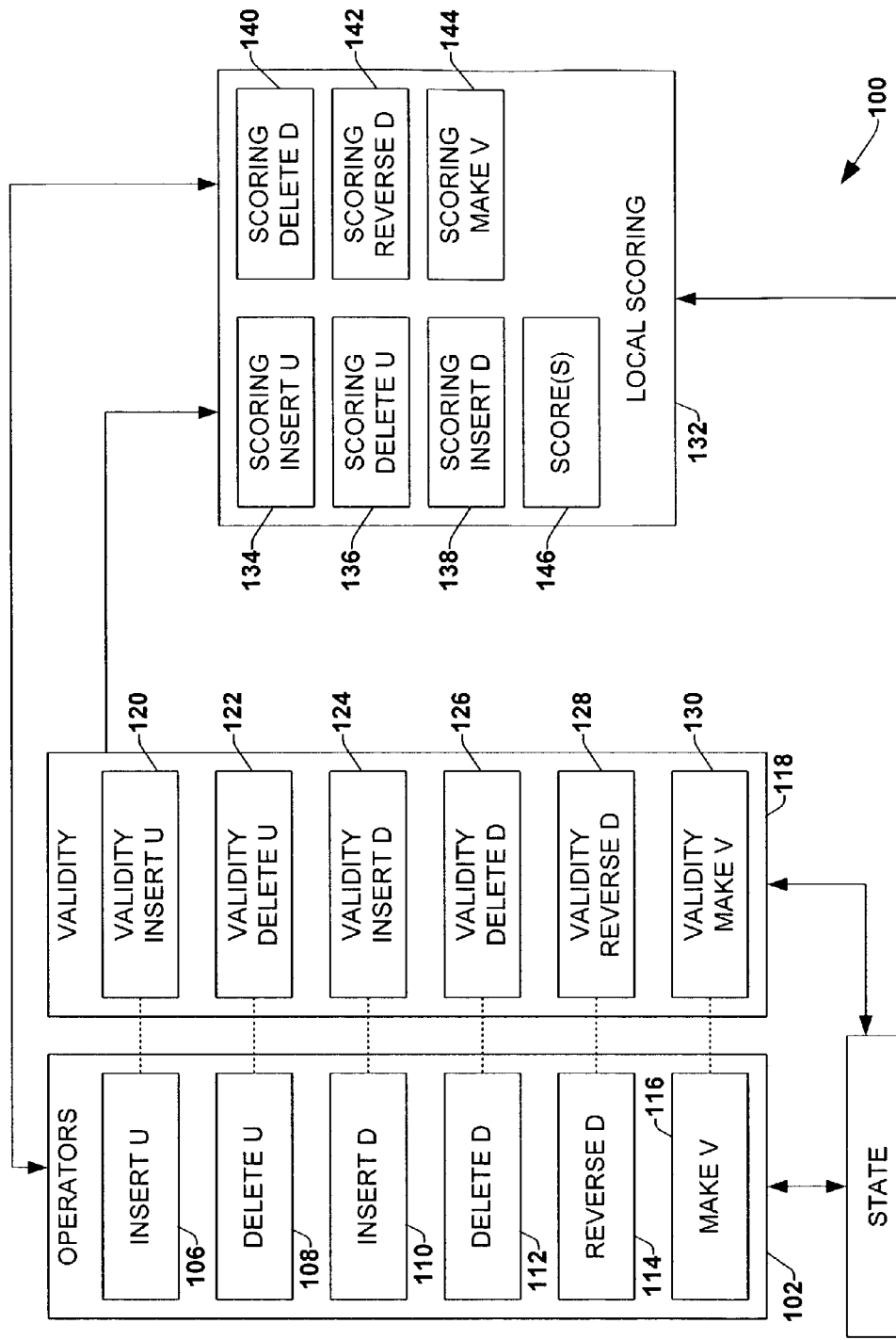
FIG. 6 is an example of a search system for searching in equivalence space in accordance with an aspect of the present invention.

FIG. 6 illustrates an example of an E-space search system 100 that can be employed to learn a network structure (e.g., Bayesian network) in accordance with an aspect of the present invention. The system 100 includes a set of operators 102 that can be applied to a state representation (e.g., a completed PDAG $P^c$) 104. Initially, the state representation can correspond to a set of nodes representing variables in a particular data domain, and may (or may not) have any edges. If the initial state representation 104, such as determined by a knowledge engineer, includes edges, but is not a completed PDAG, it can be converted into a completed PDAG for processing, such as described herein.

The set of operators 102 can include a plurality of different operators 106, 108, 110, 112, 114 and 116 that can be applied to a state representation in E-space. The operators 106-116 and their application are subject to the constraint that the resulting graph is a PDAG (e.g., a graph containing no directed cycles) that admits a consistent extension. If an operator does, in fact, result in a PDAG that admits a consistent extension, the operator is valid. If the operator does not result in a PDAG that admits a consistent extension, the operator is not valid. The operators 106-116 correspond to six possible search operators that can be applied to the current state representation 104.

In the example of FIG. 4, the operator (INSERT U) 106 operates to insert an undirected edge between x and y for any pair of nodes x and y that are not adjacent in the representation $P^c$ 104, we can insert. The operator (DELETE U) 108 can be applied to delete any undirected edge x-y in the representation $P^c$ 104. A directed edge can be inserted in either direction for any pair of nodes x and y that are not adjacent in the representation $P^c$ 104 by applying the operator (INSERT D) 110. The operator (DELETE D) 112 acts to delete any directed edge x→y in representation $P^c$ 104. For any directed edge x→y in the representation $P^c$ 104, the edge can be reversed by applying the (REVERSE D) operator 114. The operator (MAKE V) 116 operates as follows: for any triple of nodes x, y and z in the representation $P^c$ 104, such that (1) x and z are not adjacent, (2) $P^c$ contains the undirected edge x-y, and (3) $P^c$ contains the undirected edge y-z, the v-structure x→y←z can be constructed.

The system 100 also includes a validity function 118 that includes validity conditions 120-130 associated with each of the operators 106-116, respectively. Each of the validity conditions 120-130 can be employed to determine whether an associated operator 106-116 is valid for the current state representation 104. In particular, a given operator is valid if, when applied to a completed PDAG state representation 104, it results in a PDAG that admits a consistent extension (see, e.g., "State representation in equivalence class space"). There is one other restriction that can be placed on the insertion operators 106 and 110; namely, the insertion an edge is allowed only if it has the same "directedness" in the resulting completed PDAG. In other words, a directed edge should not be inserted if that edge will be undirected in the resulting completed PDAG, and an undirected edge should not be inserted if the edge will be directed in the resulting completed PDAG.

The system 100 includes a local scoring component 132 to evaluate potential improvements to the state representation 104 for the operators 106-116 in accordance with an aspect of the present invention. The scoring component 132 utilizes a defined scoring criterion (e.g., MDL or BIC) for all of the operators 106-116. The scoring component 132 includes local functions 134-144 associated with each of the respective operators 106-116 for locally scoring the operators. The local functions 134-144 measure the increase in the (score-equivalent and decomposable) scoring criterion that will result from applying the operator. The local functions 134-144 compute scores 146 associated with applying respective operators.

By way of particular illustration, the local functions 134-144 can compute an increase in score from the current state to a next state due to application of the respective operators. The scoring can be performed for a given operator on a local or adjacency set of nodes affected by applying the given operator (e.g., neighbors and/or parents to the node(s) where the operator will be applied). The increase in score can then be employed during the heuristic search process to find the local maximum for the current state representation 104. Those skilled in the art will understand and appreciate that any heuristic-based search algorithm (e.g., greedy search, best first search, limited discrepancy search, simulated annealing, etc.) can utilize local scores corresponding to changes imposed by the operators to determine which neighbor state to visit next. In the case of greedy search, for example, the neighbor state that has the highest score is visited next at each step of the algorithm. After a neighbor state has been identified by the algorithm as the next state to explore, the local scoring component 132 can cause the operator 106-116 that resulted in the highest score to be applied to the current state representation 104 and move to its next state (e.g., a completed PDAG). As mentioned above, in practice, it may be necessary to employ a suitable transformation algorithm to arrive at a completed PDAG after applying the operator. The set of operators, validity conditions and scoring will then be employed in a similar manner so long as the search algorithm requires. It is to be understood and appreciated that the validity tests could be delayed until after scoring, although this could result in scoring invalid operators.

By way of further example, consider a data structure for a PDAG that allows for (1) random access to all of the nodes, and (2) direct access to all adjacent nodes (e.g., parents, children and neighbors) of each node. The presence of semi-directed path (i.e., the same as a directed path except that any of the edges may be undirected) or undirected paths that do not pass through some set S can be determined as follows. First, each node in S is marked, and then a depth-first search is performed from the source node (following the appropriate links, depending on the type of path) looking for the destination node, where the search is not allowed to pass through any marked node (or any previously-visited node). This algorithm takes time $O(|S|+|E|)$ in the worst case, where $|E|$ is the number of edges in the graph. If the path-identification algorithm ever becomes a bottleneck in the running time of the search algorithm, it will be understood that a search algorithm can postpone checking the path conditions until the operator is tentatively chosen. There is a tradeoff with this approach because typically search algorithms need the score of an operator to determine whether or not it is chosen; namely, if the validity test is postponed, it could result in unnecessarily scoring invalid operators.

FIG. 7A depicts an example of a possible initial state representation illustrated as a completed PDAG 150 having six nodes that includes a v-structure x→z←y, a (compelled) directed edge z→w, and undirected edges v-y and u-y. This initial representation, for example, could correspond to an intermediate structure or a starting state for a given data domain.

FIGS. 7B-7G illustrate PDAGs resulting from application of the six operators 106-116, such as shown and described with respect to FIG. 6, to the initial completed PDAG 150 (FIG. 7A). In particular, FIG. 7B depicts a PDAG 152 resulting from inserting an undirected edge u-v to the state structure 150 (FIG. 7A). FIG. 7C shows a PDAG 154 that results from inserting a directed edge u→w into the initial state 150 (FIG. 7A). A reversal of a directed edge x→z in the initial state 150 (FIG. 7A) provides the PDAG 156 illustrated in FIG. 7D. If an undirected edge y-u were deleted from the state 150 (FIG. 7A), the PDAG 158 of FIG. 7E would result. Similarly, deletion of a directed edge y→z results in the PDAG 160 shown in FIG. 7F. Finally, application of the MAKE V operator v→y←u to the state 150 (FIG. 7A) produces the PDAG 162 depicted in FIG. 7G. In view of the restriction noted above—namely, that after adding a directed (undirected) edge, that edge must remain directed (undirected) in the resulting completed PDAG—it is to be appreciated that, for example, a directed edge v→u cannot be inserted into the initial state 150 (FIG. 7A).

The following Table 1 summarizes the results of six theorems and corresponding six corollaries for each of six different operators (e.g., operators 106-116 of FIG. 6) that can be employed in E-space in accordance with an aspect of the present invention. The following notation is to simplify presentation: for a set of nodes M and a node x, $M^{+x}$ is used as shorthand for $M \cup \{x\}$. Similarly, $M^x$ is used as shorthand for $M \setminus \{x\}$. Table 1 provides for each of the E-space operators both: (1) necessary and sufficient conditions for that operator to be valid (e.g., validity conditions 120-130 of FIG. 6), and (2) the increase in score that results from applying that operator (e.g., scoring functions 134-144 of FIG. 6).

and appreciate that the operators are complete for E-space. That is, given any pair of completed PDAGs $P^c_1$ and $P^c_2$ that both admit a consistent extension, there exists a sequence of valid operators from the six operators of Table 1 that moves from $P^c_1$ to $P^c_2$.

Second Example of E-Space Search System and Operators

Figure 8:
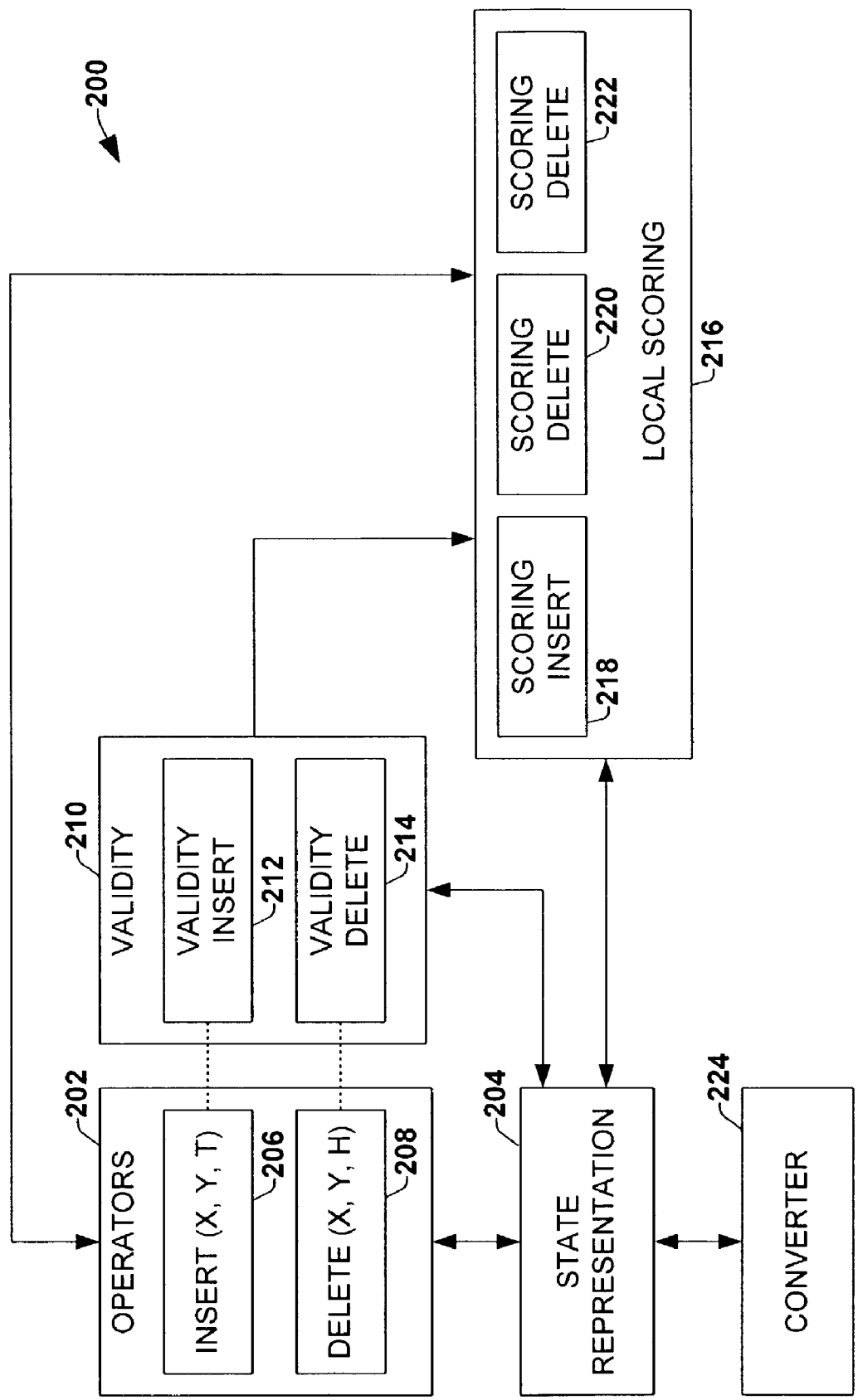
FIG. 8 is another example of a search system for searching in equivalence space in accordance with an aspect of the present invention.

FIG. 8 illustrates another example of a search system 200 that can be utilized to search for a network structure in accordance with an aspect of the present invention. The search space utilized by the system is based on an original conjecture (referred to herein as "the Meek conjecture") set forth in *Graphical Models: Selecting causal and statistical models*, a PhD thesis by Christopher Meek, Carnegie Mellon University (1997). This conjecture, if true, leads to the following and somewhat surprising result: given that the generative distribution has a perfect map (that is, the independencies and dependencies in the distribution from which the data was generated can be represented exactly) in a DAG defined over the observables, then there exists a sparse search space (that is, a space in which each state is connected to a small fraction of the total states) to which we can apply a greedy search algorithm that, in the limit of large number of training cases, identifies the generative structure. The system 200 thus employs a search space, using equivalence classes as states, for which all operators used in the greedy search can be scored efficiently using local functions of the nodes in the domain.

TABLE 1

| Operator | Validity Tests | Change in Score |
|---|---|---|
| Insert U<br>x – y | (1) Every undirected path from to contains a node in $N_{x,y}$ | $s(y, N^{+x}_{X,Y} \cup \Pi_Y) - s(y, N_{x,y} \cup \Pi_y)$ |
| Delete U<br>x – y | $N_{x_y}$ is a clique | $s(y, N_{x,y} \cup \Pi_t) - s(y, N^{-x}_{x,y} \cup \Pi_y)$ |
| Insert D<br>x → y | (1) Every semi-directed path from y to x contains a node in $\Omega_{x,y}$ | $s(y, \Omega_{x,v} \cup \Pi^{+x}_Y) - s(y, \Omega_{x,v} \cup \Pi_y)$ |
| Delete D<br>x → y | $N_y$ is a clique | $s(y, N_Y \cup \Pi^{-x}_y) - s(N_y \cup \Pi_y)$ |
| Reverse D<br>x → z ← y | (1) Every semi-directed path from x to y that does not include the edge x → y contains a node in $\Omega_{y,x} \cup N_y$<br>(2) $\Omega_{x,y}$ is a clique | $s(y, \Pi^{-x}_y) + s(x, \Pi^{+y}_x \cup \Omega_{y,x}) - s(y, \Pi_y) - s(x, \Pi_y \cup \Omega_{y,x})$ |
| Make V<br>x → z ← y | Every undirected path between x and y contains a node in $N_{x,y}$ | $s(z, \Pi^{+y}_z \cup N^{-z+x}_{x,y}) + s(y, \Pi_y \cup N^{-z}_{x,y}) - s(z, \Pi_z \cup N^{-z+x}_{x,y}) - s(y, \Pi_y \cup N_{x,y})$ |

The six validity conditions (or theorems) and corresponding scoring functions (or corollaries) demonstrate, for each of the six types of operators, how to test whether or not the operator is valid as well as how to score the operator. That is, Table 1 shows how to score locally the E-space operators 106-116 presented with respect to FIG. 6. For example, given a decomposable, score-equivalent scoring criterion for DAG models, the increase in score that results from applying each of the operators can be calculated by evaluating relatively few terms. Those skilled in the art will understand Referring to FIG. 8, the system 200 includes a set of operators 202 that can be applied to a state representation 204 in E-space. The operators 202 transform the representation 204 from one state to another to efficiently traverse the search space. For example, the state representation 204 corresponds to an equivalence class of DAGs, such as represented by a completed PDAG.

The set of operators 202 can include one or more (e.g., a plurality of) different operators 206 and 208 that can be applied to the state representation 202. Similar to the system described above with respect to FIG. 6, the operators 206 and 208 are subject to the constraint that the resulting graph is a PDAG that admits a consistent extension. If an operator results in a PDAG that admits a consistent extension, the operator is valid. Otherwise, the operator is invalid. In order to efficiently determine whether the operators 206 and 208 are valid (or legal), the system 200 includes a validity component 210 according to an aspect of the present invention.

The two operators 206 and 208 can be employed to implement the connectivity for the separate phase of the search. By way of illustration, the operator 206 corresponds to an INSERT(X, Y, T). Given that the state 204 is represented as a completed PDAG $P^c$, the operator 206 can be as follows: For non-adjacent nodes X and Y in $P^c$, and for any subset T of the neighbors of Y that are not adjacent to X, the Insert (X, Y, T) operator modifies $P^c$ by (1) inserting the directed edge X→Y, and (2) for each T∈T, directing the previously undirected edge between T and Y as T→Y. The term T denotes the set-argument of the Insert operator 206 because every node in this set becomes a "tail" node in a new v-structure as a result of the operator.

The other operator 208 can be expressed Delete(X, Y, H), where H is used to denote that every node in this set becomes a "head" node in a new v-structure as a result of this operator. In particular, the operator 208 can be defined as follows: For adjacent nodes X and Y in $P^c$ connected either as X-Y or X→Y, and for any subset H of the neighbors of Y that are adjacent to X, the Delete(X, Y, H) operator 208 modifies $P^c$ by deleting the edge between X and Y, and for each H∈H, (1) directing the previously undirected edge between Y and H as Y→H and (2) directing any previously undirected edge between X and H as X→H. As used herein, the Insert(X, Y, T) and Delete(X, Y, H) operators define a set of operators called Meek operators.

The validity component 210 includes corresponding validity conditions 212 and 214 that evaluate the current state 204 to ascertain whether associated operators 206 and 208 are valid for that state. An operator 206, 208 is valid if application of the operator to the current state admits a consistent extension. The validity component 210 can also be used to generate a set of candidate operators for each pair of nodes X and Y in the current state 204 based on the validity conditions 212 and 214 for the respective operators 206 and 208. For example, a candidate set of operators can be generated (or updated) for each state change to facilitate scoring and state transitions in accordance with an aspect of the present invention.

The system 200 further includes a local scoring component 216 that includes local functions 218 and 220 associated with each of the respective operators 206 and 208. Each of the local functions 218, 220 evaluates the change in the scoring function for the search state that results from applying a respective operator 206, 208 on the current state 204. In accordance with a particular aspect of the present invention, the scoring function is score equivalent and decomposable. To simplify the following discussion, the use of subscripts have been omitted from the notation. Thus, $Pa_Y$ denotes the parents of node Y in the completed PDAG representation of the current state. $Pa_Y^{+X}$ and $Pa_Y^{-X}$ as shorthand for $Pa_Y \cup \{X\}$ and $Pa_Y \setminus \{X\}$, respectively. The notation $NA_{Y,X}$ denotes the set of nodes that are neighbors of node Y and are adjacent to node X in the current state. In view of this nomenclature and by way of illustration, the following theorem can define a validity condition 212:

Let $P^c$ be any completed PDAG, and let $P^{c\prime}$ denote the result of applying the Insert(X, Y, T) operator 206 to $P^c$. There exists a consistent extension G of $P^c$ to which adding the edge X→Y results in a consistent extension G' of $P^{c\prime}$ if and only if in $P^c$
1. $NA_{Y,X} \cup T$ is a clique, and
2. Every semi-directed path from Y to X contains a node in $NA_{Y,X} \cup T$ As a corollary to this theorem, it follows that, for any score-equivalent decomposable scoring criterion, the increase in score that results from applying a legal operator Insert(X, Y, T) to a completed PDAG $P^c$ can be expressed as follows:

$$\text{Score}_{increase} = s(Y, NA_{Y,X} \cup T \cup Pa_Y^{+X}) - s(Y, NA_{Y,X} \cup T \cup Pa_Y). \quad (4)$$

Thus, the scoring insert function 218 can employ Equation 4 to compute a score increase locally due to application of the insert operator 206.

With respect to the delete operator 208, the following theorem can define a validity condition 214 for the delete operator 208:

Let $P^c$ be any completed PDAG that contains either X→Y or X-Y, and let $P^{c\prime}$ denote the result of applying the operator Delete(X, Y, H) to $P^c$. There exists a consistent extension G of $P^c$ that contains the edge X→Y from which deleting the edge X→Y results in a consistent extension G' of $P^c$ if and only if $NA_{Y,X} \setminus H$ is a clique.

As a corollary to this theorem, it can be shown that for any score-equivalent decomposable scoring criterion, the scoring delete function 220 can compute an increase in score, which results from applying a legal operator 208 to a completed PDAG $P^c$, as follows:

$$\text{Score}_{increase} = s(Y, \{NA_{Y,X} \setminus H\} \cup Pa_Y^{-X}) - s(Y, \{NA_{Y,X} \setminus H\} \cup Pa_Y) \quad (5)$$

The following Table 2 summarizes the foregoing theorems and corollaries for the Meek operators 206 and 208 by stating necessary and sufficient validity conditions and (local) change in score for each of the operator in this search space.

TABLE 2

| Operator | Validity Tests | Change in Score |
|---|---|---|
| Insert (X, Y, T) | $NA_{X,Y} \cup T$ is a clique<br>Every semi-directed path From Y to X contains A node in $NA_{X,Y} \cup T$ | $s(Y, NA_{Y,X} \cup T \cup Pa_Y^{+X})$ − $s(Y, NA_{Y,X} \cup T \cup Pa_Y)$ |
| Delete (X, Y, H) | $NA_{X,Y} \cup H$ is a clique | $s(Y, \{NA_{Y,X} \setminus H\} \cup Pa_Y^{-X})$ − $s(Y, \{NA_{Y,X} \setminus H\} \cup Pa_Y)$ |

Those skilled in the art will understand and appreciate that there may be some overlap between the Meek operators (Table 2) and the set of operators described above with respect to Table 1. The amount of overlap generally depends on the T and H. For example, if T is empty (or null), then Insert (X, Y, T) corresponds to Insert U or Insert D. Similarly, if H is empty (or null), then Delete (X, Y, H) corresponds to Delete U or Delete D.

A subset of candidate operators (e.g., which can include a subset of none, some or all of the operators) can be generated after each state change. It is to be appreciated that the majority of the operators at a given step of the algorithm both will remain legal and will have the same score at the next step of the algorithm. Given that it is desirable to generate or update a set of operators corresponding to a pair of nodes X and Y, a convenient approach is to employ the validity tests for the respective operators 206 and 208 directly to generate those operators without regard to the constraints, and then test every one.

By way of illustration, in the first phase of a two-phase greedy search algorithm, referred to as a Greedy Equivalence Search (GES), only those nodes that are not adjacent will have a corresponding set of operators. For such pair X and Y whose corresponding operators need to be generated, $T_0$ is defined to be the set of all neighbors of Y that are not adjacent to X. Let $T_0^*$ denote the power set of $T_0$; that is, $T_0^*$ contains all possible subsets of $T_0$. The legality of (and possibly score) the result of Insert (X, Y, T) is tested for every $T \epsilon T_0^*$.

In the second phase of GES, only those nodes that are adjacent will have a corresponding set of operators. For such a pair X and Y whose corresponding operators need to be generated—and for which there is either an undirected edge between X and Y or a directed edge from X to Y—$H_0$ is defined to be the set of all neighbors of Y that are adjacent to X. Let $H_0^*$ denote the power set of $H_0$. We then test the legality of (and possibly score) the result of Delete(X, Y, H) for every $H \epsilon H_0^*$. Note that before beginning the first (second) phases of the algorithm, all of the Insert (Delete) operators corresponding to non-adjacent (adjacent) nodes should be initially generated.

For a set of nodes S of size k, there are $2^k$ elements in the power set of S. It follows that the feasibility of this implementation for GES will, to a large degree, depend on the number of neighbors of the nodes in the completed PDAGs (e.g., state representation 204) that are encountered. For example, if there is a node with too many neighbors, there may be too many operators to test practicably. In particular, during the first phase of the algorithm, in order to generate the operators for a pair of non-adjacent nodes X and Y, the implementation can be slow if Y has many neighbors that are not adjacent to X. Similarly, during the second phase of the algorithm, the implementation may be slow for (adjacent) X and Y if Y has many neighbors that are adjacent to X.

It is to be understood and appreciated that there are a number of techniques that can be applied to more efficiently generate candidate operators from the Meek operators (as well as other operators described herein) corresponding to a pair of nodes in accordance with an aspect of the present invention. For example, consider the first validity condition for the Insert operator 206 (also given in Table 2): namely, that the set $NA_{Y,X \cup} T$ must be a clique. If this test fails for some set of nodes T, then it will also fail for any T' that contains T as a subset. Thus, additionally computational efficiency can be achieved by not generating candidates that are known to be invalid.

A similar optimization can be made for the Delete operator 208, except that only the cost of performing the validity test is saved. In particular, if the validity test for the Delete operator passes for some set H, then we know it will also pass for any set H' that contains H as a subset. Time also can be saved by noting that if the second validity condition for the Insert operator passes for some T, then it will also pass for any T' that contains T as a subset. Finally, it is to be understood and appreciated that, the generation of distinct operators that result in the same neighbor state can be avoided. Delete(X, Y, H) and Delete(Y, X, H) result in the same state (e.g., where if the edge between X and Y is undirected), so only one of them need be generated. A similar result for the Insert operator 206 exists when the set T is empty or null (e.g., T=∅). In particular, if X and Y have the same parents, then Insert(X, Y, ∅) and Insert(Y, X, ∅) result in the same state. For additional information concerning techniques to further improve efficiency, see, for example, *Learning equivalence classes of Bayesian-network structures*, David Maxwell Chickering, Technical Report MSR-TR-2001-65, Microsoft Research (2001).

In typical worst case situation, there can be an exponential number of legal operators for a particular state in the search. As was mentioned above, however, neighbors can be heuristically pruned in this situation to make the search practical. For example, it may be desirable to only search through equivalence classes where the member DAGs have some upper bound k on the number of parents for each node. Thus, the search can be reduced to a polynomial number of "v-structure sets" for each pair of nodes. In practice, however, it will be appreciated that there has not been a domain for which GES has encountered a state that has too many neighbors.

As is evident from the simplicity of the legality constraints of Table 2 and the foregoing discussions, there are a number of ways to efficiently update (or regenerate) the valid operators after each step of GES (e.g., a state change) according to an aspect of the present invention. For example, consider the set of Insert operators 206 corresponding to the nodes X and Y. Suppose that all the operators have been generated and scored at a given step of (the first phase of) GES, and one desires to know whether these operators remain legal and have the same score after applying some operator.

Table 2 demonstrates that if the neighbors of Y have not changed, the first legality condition must still hold for all previously-valid operators. This is because edges are being added in this phase and any clique must remain a clique. Furthermore, if the parents of node Y have not changed, the second legality condition only needs to be checked (assuming the first condition holds true) if the score of the operator is higher than the best score provided so far. Otherwise, it is known that regardless of whether the operator is legal or not, it will not be chosen in the next step.

Finally, it is to be appreciated that an optimization technique that is equally applicable to both GES and alternative search algorithms is to cache away previously-computed local scores corresponding to a node. In this way, when transitioning to the second phase of GES, many of the operators can be scored without an explicit call to the scoring function. While the foregoing example was described with respect to a particular type of heuristic search, namely GES, those skilled in the art will understand and appreciate that other heuristic search approaches could be utilized to search equivalence space in accordance with an aspect of the present invention. Examples of other searches that could be utilized include a best first search, a limited discrepancy search, simulated annealing, and so forth.

With reference again to FIG. 8, after applying an operator to a completed PDAG, the resulting PDAG is not necessarily completed. Therefore, it may be necessary to convert the resulting PDAG to a corresponding completed PDAG representation of the resulting equivalence class. Accordingly, the system 200 can include a converter 224 programmed to convert the state representation (e.g., a PDAG) 204 resulting from application of the operator having the highest score to a completed PDAG representation in E-space. The converter 224, for example, can implement a transformation algorithm that employs a two-part process. The first part of the algorithm extracts a consistent extension from the (not completed) PDAG. The second part constructs a completed PDAG from that DAG, which can be stored as the current state representation 204 for subsequent searching. It is to be appreciated that if the (not completed) PDAG that results from an operator 206, 208 admits a consistent extension, the operator is valid. Otherwise, the operator 206, 208 is not valid and its application to the search space can be precluded. While the validity search has been described as occurring prior to scoring, it is to be understood and appreciated that the scoring could occur prior to testing validity of the operators, although this generally would be at the possible expense of scoring invalid operators.

Example Implementation of Model Generator

Figure 9:
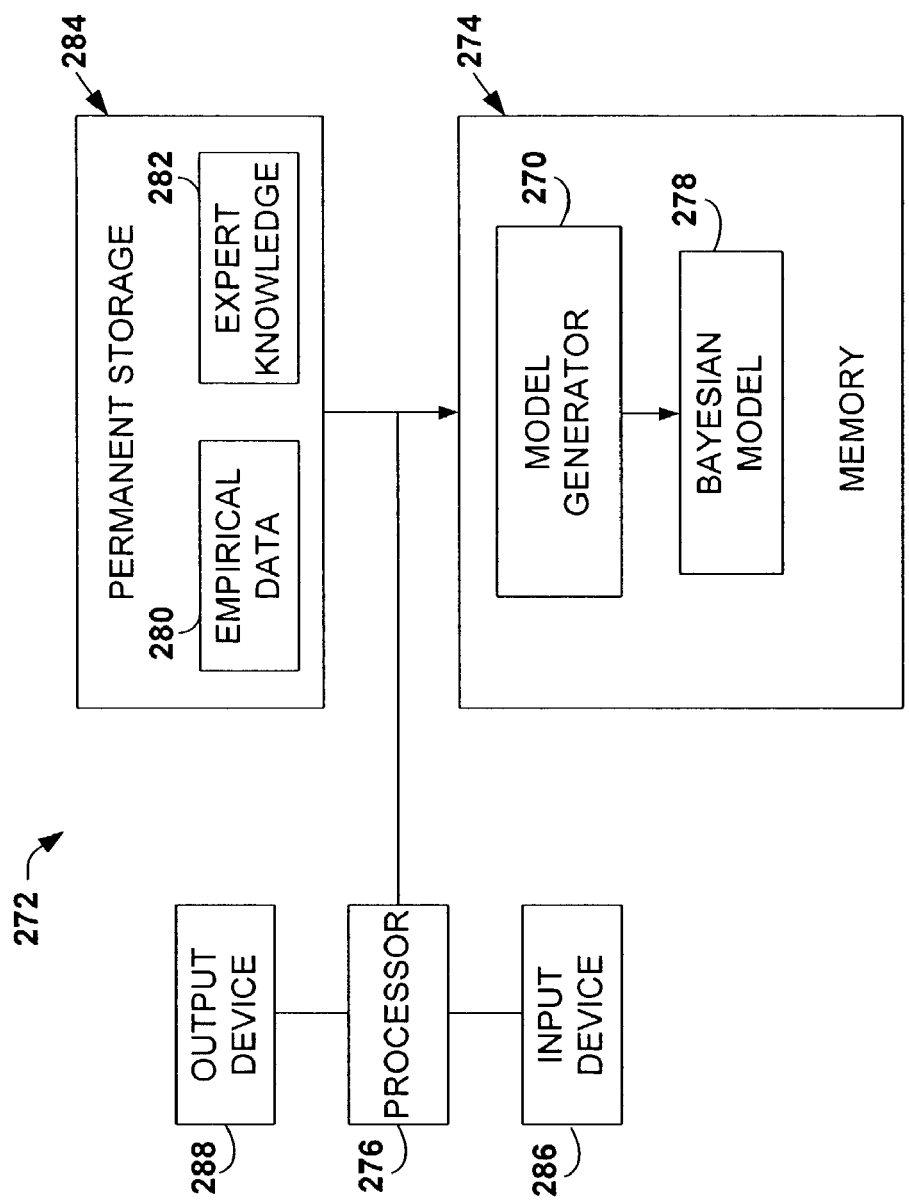
FIG. 9 is an example of a computer-implemented search system in accordance with an aspect of the present invention.

FIG. 9 illustrates an example of a model generator 270 implemented within a generic computer system 272 in accordance with an aspect of the present invention. The model generator 270 is illustrated as residing within a memory 274 coupled to a central processor (e.g., a CPU) 276. The model generator 270, for example, includes computer executable instructions that reside in the memory 274 for efficiently searching E-space and generating a graph model (e.g., a Bayesian network) 278 based on data. The data, for example, can include empirical data 280 and expert knowledge 282. In accordance with an aspect of the present invention, the model 278 corresponds to Bayesian network structure for an equivalence class of models. In a particular implementation, for example, the model generator employs equivalence classes as states and scores a set of one or more operators locally for the data domain. For example, the model generator 270 can heuristically search through the E-space by scoring the operators locally with a decomposable scoring criteria.

By way of example, the expert knowledge 282 typically comprises a sample size, and the prior on structures for sample data, such as time series data, such as provided by an expert in a given field. The empirical data 280 and the expert knowledge 282 can reside in a permanent storage device 284 (locally or remotely). The empirical data 280 typically includes cases stored in a database, such as "an empirical data database". With both the empirical data 280 and the expert knowledge 282, a user, such as a knowledge engineer, can employ the model generator 270 to generate the network model 278 in accordance with an aspect of the present invention. The manner in which the model generator can be programmed to implement such functionality will be apparent based on the description contained in this document.

Figure 10:
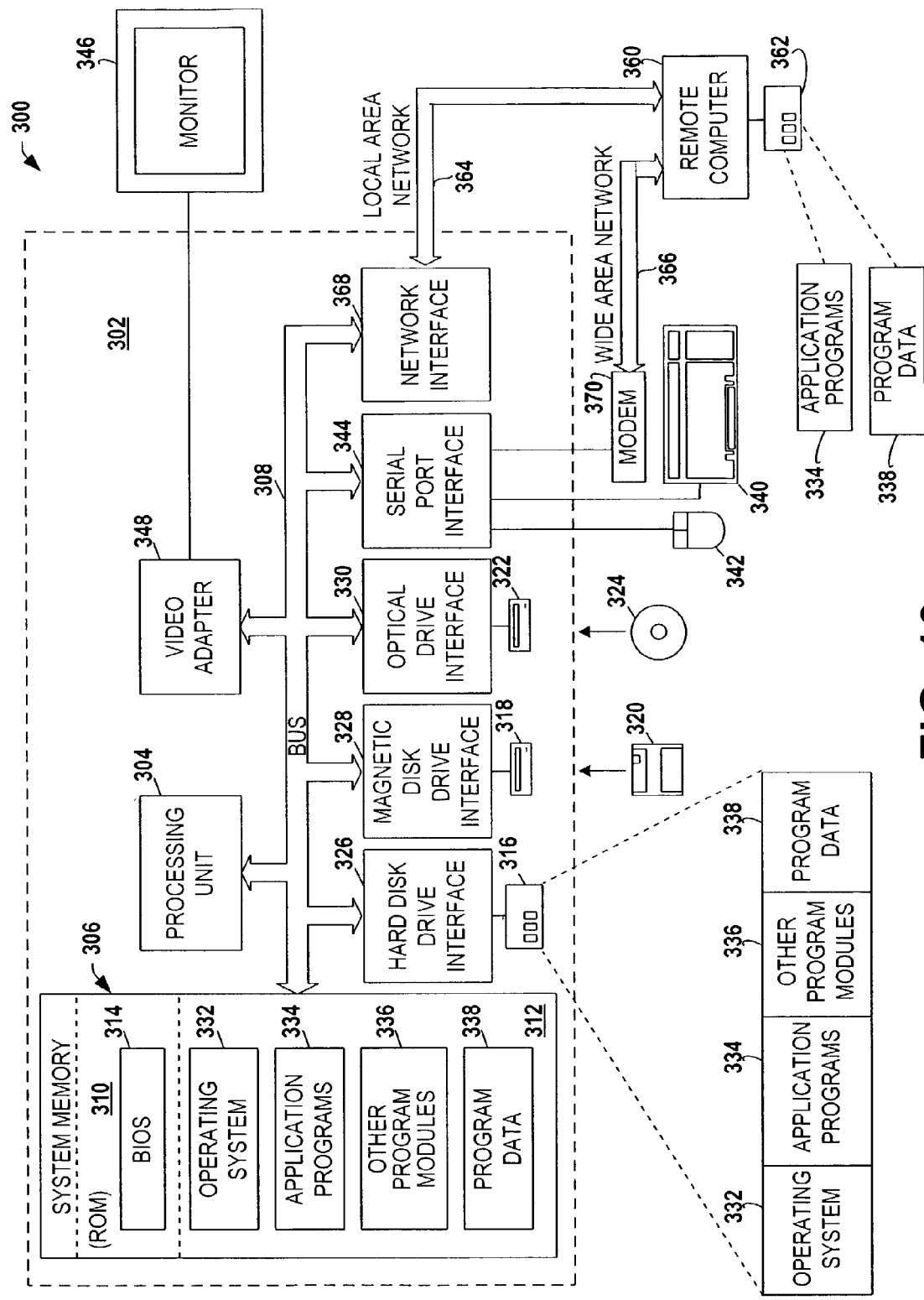
FIG. 10 is an example of a possible operating environment in which a search system can be implemented in accordance with an aspect of the present invention.

Possible Operating Environment:

In order to provide additional context for implementing various aspects of the present invention, FIG. 10 and the following discussion are intended to provide a brief, general description of a suitable computing environment 300 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 300 for implementing the various aspects of the invention includes a conventional computer 302, including a processing unit 304, a system memory 306, and a system bus 308 that couples various system components, including the system memory, to the processing unit 304. The processing unit 304 may be any commercially available or proprietary processor. In addition, the processing unit may be implemented as multi-processor formed of more than one processor, such as may be connected in parallel.

The system bus 308 may be any of several types of bus structure including a memory bus or memory controller, a peripheral bus, and a local bus using any of a variety of conventional bus architectures such as PCI, VESA, Microchannel, ISA, and EISA, to name a few. The system memory 306 includes read only memory (ROM) 310 and random access memory (RAM) 312. A basic input/output system (BIOS) 314, containing the basic routines that help to transfer information between elements within the computer 302, such as during start-up, is stored in ROM 310.

The computer 302 also may include, for example, a hard disk drive 316, a magnetic disk drive 318, e.g., to read from or write to a removable disk 320, and an optical disk drive 322, e.g., for reading from or writing to a CD-ROM disk 324 or other optical media. The hard disk drive 316, magnetic disk drive 318, and optical disk drive 322 are connected to the system bus 308 by a hard disk drive interface 326, a magnetic disk drive interface 328, and an optical drive interface 330, respectively. The drives 316-222 and their associated computer-readable media provide nonvolatile storage of data, data structures, computer-executable instructions, etc. for the computer 302. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 300, and further that any such media may contain computer-executable instructions for performing the methods of the present invention.

A number of program modules may be stored in the drives 316-222 and RAM 312, including an operating system 332, one or more application programs 334, other program modules 336, and program data 338. The operating system 332 may be any suitable operating system or combination of operating systems. By way of example, the application programs 334 and program modules 336 can include a set of one or more operators that can be applied to an E-space representation to modify the state of the representation. Additionally, the programs and modules 334 and 336 can include validity to determine which of the available operator(s) are valid as well as and scoring functions to score operators and to determine which will result in the greatest increase in score for the current state. The program data 338 also can include input data from which a model is generated.

A user can enter commands and information into the computer 302 through one or more user input devices, such as a keyboard 340 and a pointing device (e.g., a mouse 342). Other input devices (not shown) may include a microphone, a joystick, a game pad, a satellite dish, wireless remote, a scanner, or the like. These and other input devices are often connected to the processing unit 304 through a serial port interface 344 that is coupled to the system bus 308, but may be connected by other interfaces, such as a parallel port, a game port or a universal serial bus (USB). A monitor 346 or other type of display device is also connected to the system bus 308 via an interface, such as a video adapter 348. In addition to the monitor 346, the computer 302 may include other peripheral output devices (not shown), such as speakers, printers, etc.

It is to be appreciated that the computer 302 can operate in a networked environment using logical connections to one or more remote computers 360. The remote computer 360 may be a workstation, a server computer, a router, a peer device or other common network node, and typically includes many or all of the elements described relative to the computer 302, although, for purposes of brevity, only a memory storage device 362 is illustrated in FIG. 5. The logical connections depicted in FIG. 5 may include a local area network (LAN) 364 and a wide area network (WAN) 366. Such networking environments are commonplace in offices, enterprise-wide computer networks, intranets and the Internet.

When used in a LAN networking environment, for example, the computer 302 is connected to the local network 364 through a network interface or adapter 368. When used in a WAN networking environment, the computer 302 typically includes a modem (e.g., telephone, DSL, cable, etc.) 370, or is connected to a communications server on the LAN, or has other means for establishing communications over the WAN 366, such as the Internet. The modem 370, which can be internal or external relative to the computer 302, is connected to the system bus 308 via the serial port interface 344. In a networked environment, program modules (including application programs 334) and/or program data 338 can be stored in the remote memory storage device 362. It will be appreciated that the network connections shown are exemplary and other means (e.g., wired or wireless) of establishing a communications link between the computers 302 and 360 can be used when carrying out an aspect of the present invention.

In accordance with the practices of persons skilled in the art of computer programming, the present invention has been described with reference to acts and symbolic representations of operations that are performed by a computer, such as the computer 302 or remote computer 360, unless otherwise indicated. Such acts and operations are sometimes referred to as being computer-executed. It will be appreciated that the acts and symbolically represented operations include the manipulation by the processing unit 304 of electrical signals representing data bits which causes a resulting transformation or reduction of the electrical signal representation, and the maintenance of data bits at memory locations in the memory system (including the system memory 306, hard drive 316, floppy disks 320, CD-ROM 324, and remote memory 362) to thereby reconfigure or otherwise alter the computer system's operation, as well as other processing of signals. The memory locations where such data bits are maintained are physical locations that have particular electrical, magnetic, or optical properties corresponding to the data bits.

Methodologies

Figure 11:
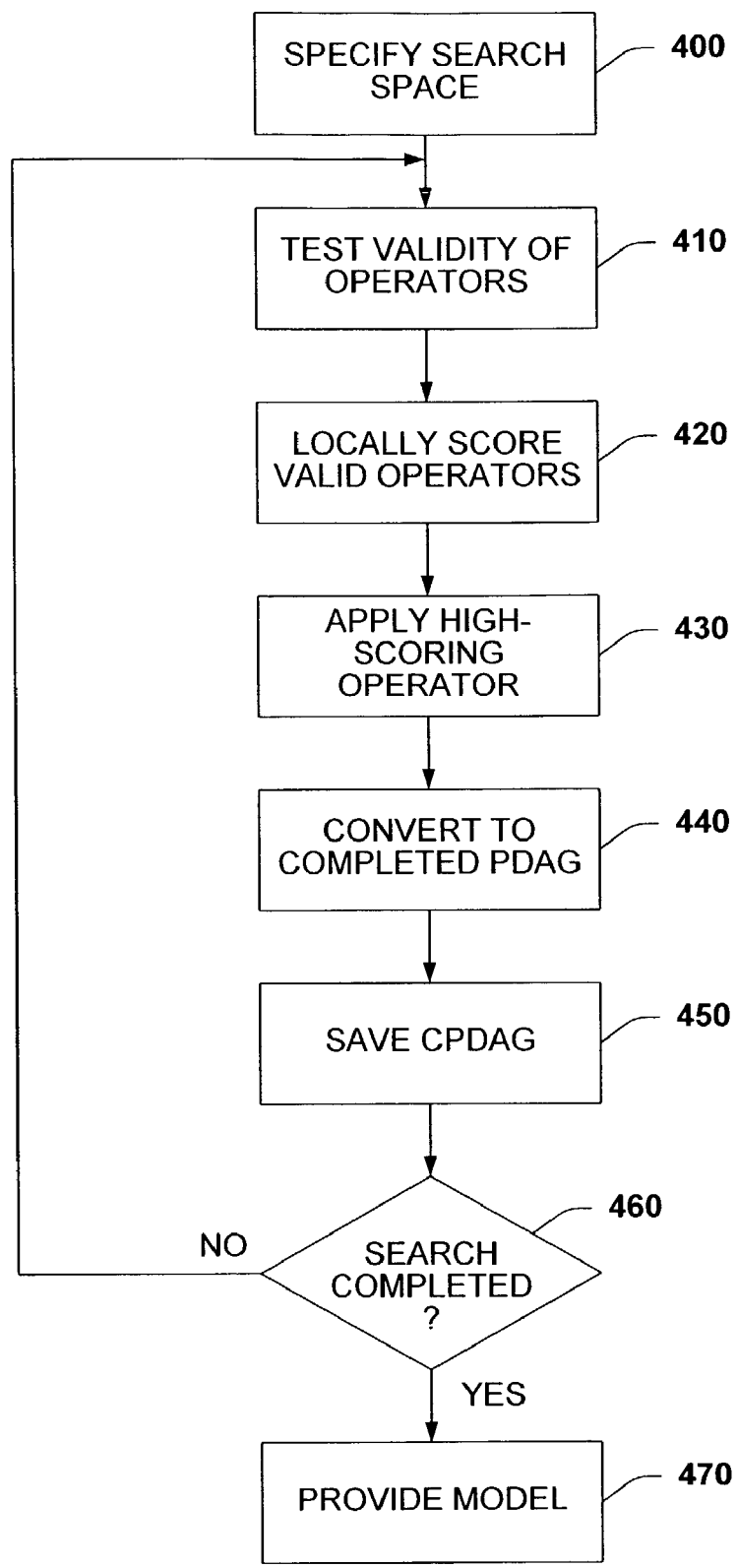
FIG. 11 is a flow diagram illustrating a methodology for efficiently learning a Bayesian network in accordance with an aspect of the present invention.

In view of the foregoing structural and functional features described above, a methodology for learning a Bayesian network, in accordance with the present invention, will be better appreciated with reference to FIG. 11. While, for purposes of simplicity of explanation, the methodology of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. It is further to be appreciated that the following methodology can be implemented as computer-executable instructions, such as software stored in a computer-readable medium. Alternatively, the methodology may be implemented as hardware or a combination of hardware and software.

The methodology of FIG. 11 begins at 400 by specifying a search space. The search space includes, for example, a set of possible states, a representation of the states (e.g., a diagrammatic representation, such as a graph) and a set of one or more transformation operators that can be applied to the representation to implement a state change. In accordance with an aspect of the present invention the search is performed in E-space, which facilitates searching over equivalence classes of DAG models, the operators include a plurality of different operators that can be applied to a state representation in E-space. The operators are subject to the constraint that the resulting graph is a PDAG (e.g., a graph containing no directed cycles) and that it admits a consistent extension. The operators can include those described with respect to FIG. 6, FIG. 8, a hybrid set of operators corresponding to a combination of operators from both sets (FIGS. 6 and 8), or an alternative set of operators for transforming the E-space representation within the constraints set forth herein.

Next, at 410, the validity of the operator(s) is tested. The validity of each operator can be tested based on application of the operator to the current state and determining whether the above constraint is satisfied. Alternatively, the validity of an operator can be tested by using predetermined validity conditions associated with each respective operator. The validity conditions can vary as a function of the particular operator, which functions can be applied to determine whether the constraint is met for the current state without actually applying the operator. If an operator results in a PDAG that admits a consistent extension, the operator is valid. If the operator does not result in a PDAG that admits a consistent extension, the operator is not valid.

At 420, valid operators are scored locally. In accordance with an aspect of the present invention, the scoring is implemented by scoring the operators locally with a decomposable scoring function. The score, for example, can be computed as a change in local score corresponding to application of a given operator. Predefined scoring functions can be associated with operator to facilitate computing the local score. The scoring is implemented to find which operator results in a local maximum for the current state representation.

At 430, the one of the operators is applied to the current state representation. The operator being applied, for example, could be a high scoring operator, although the search algorithm could be programmed to choose an operator based on some other basis (e.g., low score, first operator to have a score above some threshold). So long as the operator is valid, this results in a PDAG that admits a consistent extension, which may or may not be complete. At 440, the resulting PDAG can be converted into a completed PDAG, such as by employing an appropriate transformation algorithm. The transformation algorithm, for example, includes two parts; namely, a PDAG-to DAG algorithm and a DAG to completed PDAG algorithm. Examples of possible transformation algorithms are described above. Then, at 450, the completed PDAG for the next state is stored. The completed PDAG can be attained by the conversion at 440 or, alternatively, the application of the operator at 430 can result in a completed PDAG, which can be saved at 450 (e.g., by skipping the conversion at 440).

Next, at 460, a determination is made as to whether the search has completed. The basis for ending the search generally will depend on the particular heuristic search being employed to search E-space. For example, possible types of heuristic searches that can be used include a greedy search, a best first search, a limited discrepancy search, simulated annealing, among others. If the determination at 460 is negative, indicating that the search has not completed (e.g., the model is still improving), the methodology can return to 410 and repeat the foregoing steps on the next state representation in E-space. After the search is complete (a positive determination at 460) and an appropriate model has been learned from the data domain being modeled, the methodology can proceed from 460 to 470 to provide a corresponding model. The model can be an equivalence class of DAGs or it can be a member DAG (e.g., a Bayesian network) derived from the Equivalence class.

What has been described above includes examples of possible implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-implemented method for generating a Bayesian network, comprising:
    specifying a search space that provides for searching over equivalence classes of the Bayesian network;
    employing a set of at least one operator relative to an equivalence class state representation in the search space upon determining whether the at least one operator is valid for the state representation;
    searching through the representation by scoring the at least one operator locally with a decomposable scoring criteria; and
    using results of the search to generate a maximum scoring Bayesian network structure stored in a computer readable medium, the structure models real-world data associated with one or more of costumers or products.

2. The method of claim 1, the set of at least one operator comprising a plurality of operators, the method further comprising determining whether each operator in the set of operators is valid for the state representation based on whether the operator, if applied to the state representation, results in a non-empty equivalence class.

3. The method of claim 2, further comprising generating a set of at least one candidate operator from the set of operators based on whether the respective operators are valid for the state representation.

4. The method of claim 2, each operator in the set of operators having an associated validity condition that defines whether each respective operator is valid for the state representation.

5. The method of claim 2, the state representation comprising at least two nodes and the set of operators comprising a first insert operator for inserting an undirected edge between a pair of the at least two nodes, a first delete operator for deleting an undirected edge between a pair of the at least two nodes connected by an undirected edge, a second insert operator for inserting a directed edge between a pair of the at least two nodes, a second delete operator for deleting a directed edge between a pair of the at least two nodes connected by a directed edge, a reverse operator for reversing a directed edge between a pair of the at least two nodes connected by a directed edge, and a make-V operator for making a V-structure from a triple of nodes.

6. The method of claim 5, each of the operators in the set of operators having an associated validity condition.

7. The method of claim 2, the state representation comprising a completed partially directed acyclic graph $P^c$ having at least two nodes X and Y, the set of operators further comprising an Insert(X, Y, T) operator for adding an edge between a pair of the at least two nodes, where T is a subset of at least one neighbor of Y not adjacent to X.

8. The method of claim 7, the Insert(X, Y, T) operator being valid if (a) $NA_{Y,X} \cup T$ is a clique and (b) every semi-directed path from Y to X contains a node in $NA_{Y,X} \cup T$, where $NA_{Y,X}$ corresponds to a set of nodes that are neighbors of node Y and are adjacent to node X in $P^c$.

9. The method of claim 8, the searching further comprising computing an increase in score $Score_{increase}$ that results from applying the Insert(X, Y, T) operator to $P^c$, wherein $$Score_{increase} = s(Y, NA_{y,x} \cup T \cup Pa_Y^{+X}) - s(Y, NA_{y,x} \cup T \cup Pa_y),$$

where $Pa_Y$ denotes parents of node Y in $P^c$; and
$Pa_Y^{+X}$ denotes $Pa_Y \cup \{X\}$.

10. The method of claim 7, the set of operators further comprising a Delete(X, Y, H) operator for deleting an edge in $P^c$, where H is a subset of at least one neighbor of Y adjacent to X.

11. The method of claim 10, the Delete(X, Y, H) operator being valid for deleting an edge between X and Y if $NA_{Y,X} \backslash H$ is a clique, where $NA_{Y,X}$ corresponds to a set of nodes that are neighbors of node Y and are adjacent to node X in $P^c$.

12. The method of claim 11, the searching further comprising computing an increase in score $Score_{increase}$ that results from applying the Delete(X, Y, H) operator to $P^c$, wherein $$Score_{increase} = s(Y, \{NA_{y,x} \backslash H\} \cup Pa_Y^{-X}) - s(Y, \{NA_{Y,X} \backslash H\} \cup Pa_Y)$$

where $Pa_Y$ denotes parents of node Y in $P^c$; and
$Pa_Y^{-X}$ denotes $Pa_Y \backslash \{X\}$.

13. The method of claim 1, the at least one operator further comprising an edge reversal operator that, when applied to a directed edge in the state representation, reverses the directed edge.

14. The method of claim 1, the at least one operator further comprising at least one Meek operator.

15. The method of claim 1, each operator in the set of at least one operator comprising a predetermined scoring function having a decomposable scoring criterion to compute a change in score associated with applying each respective operator to the state representation.

16. The method of claim 15, the scoring function being defined to enable the score to be computed without applying any operator to the state representation.

17. The method of claim 15, further comprising:
prior to computing the score for a respective operator, determining if the respective operator is valid for the state representation; and
using the predetermined scoring function to compute the score for the respective operator based on determining that the operator is valid.

18. The method of claim 1, further comprising selecting an operator from the set of at least one operator based on a score associated with the selected operator and applying the selected operator to change the representation to a next state representation.

19. The method of claim 1, the state representation comprising a completed partially directed acyclic graph (PDAG).

20. The method of claim 19, further comprising applying a selected operator locally to the state representation to provide a resulting PDAG having the same skeleton and v-structure.

21. The method of claim 20, further comprising converting the resulting PDAG representation into a completed PDAG.

22. The method of claim 1, the at least one operator comprising a plurality of operators, the method further comprising:
efficiently generating a set of valid operators from the plurality of operators based on validity conditions associated with each respective operator in the plurality of operators; and
using the set of valid operators in the searching.

23. A computer-readable medium having computer-executable instructions for performing the method of claim 1.

24. A computer-readable medium having stored thereon computer executable instructions for learning a Bayesian network that models a given data set, comprising:
specifying a search space that provides for searching over equivalence classes of the Bayesian network that models data associated with one or more of users or products;
employing a set of at least one operator applicable to an equivalence class state representation in the search space;
determining whether operators in the set of at least one operator can validly be applied to the state representation based on a validity condition associated with the respective operator;
searching through the representation by scoring valid operators locally with a decomposable scoring criteria to determine which operator to apply to the state representation to implement a state change from the state representation to a next state representation corresponding to a non-empty equivalence class;
determining and applying a highest scoring operator to transform the class state representation to a next representation; and
learning a representation as ideally modeling the data associated with the one or more users or products based on results of the search.

25. The medium of claim 24 further comprising instructions for applying a selected operator to the state representation based on a score associated therewith to generate the next state representation, and generating a list of candidate operators based on determining whether each operator in the set of at least one operator is valid for the next state representation.

26. The medium of claim 24, the state representation comprising at least two nodes and the set of operators comprising a first insert operator for inserting an undirected edge between a pair of the at least two nodes, a first delete operator for deleting an undirected edge between a pair of the at least two nodes connected by an undirected edge, a second insert operator for inserting a directed edge between a pair of the at least two nodes, a second delete operator for deleting a directed edge between a pair of the at least two nodes connected by a directed edge, a reverse operator for reversing a directed edge between a pair of the at least two nodes connected by a directed edge, and a make-v operator for making a v-structure from a triple of nodes.

27. The medium of claim 26, the determining further comprising testing the validity of each of the operators in the set of operators based on an associated validity condition.

28. The medium of claim 26, the state representation comprising a completed partially directed acyclic graph $P^c$ having at least two nodes X and Y, the set of operators further comprising an Insert(X, Y, T) operator for adding an edge between a pair of the at least two nodes, where T is a subset of at least one neighbor of Y not adjacent to X and a Delete(X, Y, H) operator for deleting an edge in $P^c$, where H is a subset of at least one neighbor of Y adjacent to X.

29. A computer-implemented method for learning a Bayesian network modeling data relating to at least one of customers or products for sale comprising:
providing an equivalence-class state representation corresponding to a class of Bayesian network structures in a search space;
searching through the state representation by computing scores corresponding to changes in the state representation associated with a plurality of operators defined in the search space, each of the scores being computed as a local function on a set of adjacency nodes associated with applying a respective operator to the state representation;
identifying a maximum scoring operator; and
applying the maximum scoring operator to the current state representation in order to generate a Bayesian network structure that closely models the at least one of customer or product data upon conclusion of the search.

30. The method of claim 29, further comprising applying one of the plurality of operators based on the searching to cause the state representation to change to a next state representation.

31. The method of claim 30, further comprising determining whether a given operator is valid for the state representation by discerning whether the given operator, if applied to the state representation, would provide a next state representation of a non-empty equivalence class.

32. The method of claim 31, further comprising generating a set of at least one candidate operator from the set of operators based on whether the respective operators are valid for the state representation.

33. The method of claim 31, each of the operators having an associated validity condition that defines whether the at least one operator will be valid for a given application to the state representation.

34. The method of claim 33, the state representation comprising at least two nodes and the set of operators comprising a first insert operator for inserting an undirected edge between a pair of the at least two nodes, a first delete operator for deleting an undirected edge between a pair of the at least two nodes connected by an undirected edge, a second insert operator for inserting a directed edge between a pair of the at least two nodes, a second delete operator for deleting a directed edge between a pair of the at least two nodes connected by a directed edge, a reverse operator for reversing a directed edge between a pair of the at least two nodes connected by a directed edge, and a make-v operator for making a v-structure from a triple of nodes.

35. The method of claim 33, the state representation comprising a completed partially directed acyclic graph $P^c$ having at least two nodes X and Y, the set of operators further comprising an Insert(X, Y, T) operator for adding an edge between a pair of the at least two nodes, where T is a subset of at least one neighbor of Y not adjacent to X.

36. The method of claim 35, the Insert(X, Y, T) operator being valid if (a) $NA_{Y,X} \cup T$ is a clique and (b) every semi-directed path from Y to X contains a node in $NA_{Y,X} \cup T$, where $NA_{Y,X}$ corresponds to a set of nodes that are neighbors of node Y and are adjacent to node X in $P^c$.

37. The method of claim 36, further comprising computing an increase in score $Score_{increase}$ that results from applying the Insert(X, Y, T) operator to $P^c$, wherein $$Score_{increase} = s(Y, NA_{Y,X} \cup T \cup Pa^{+X}) - s(Y, NA_{Y,X} \cup T \cup Pa_Y),$$

where $Pa_Y$ denotes parents of node Y in $P^c$; and $Pa_Y^{+X}$ denotes $Pa_Y \cup \{X\}$.

38. The method of claim 33, the set of operators further comprising a Delete(X, Y, H) operator for deleting an edge in $P^c$, where H is a subset of at least one neighbor of Y adjacent to X.

39. The method of claim 38, the Delete(X, Y, H) operator being valid for deleting an edge between X and Y if $NA_{Y,X} \backslash H$ is a clique, where $NA_{Y,X}$ corresponds to a set of nodes that are neighbors of node Y and are adjacent to node X in $P^c$.

40. The method of claim 39, the searching further comprising computing an increase in score $Score_{increase}$ that results from applying the Delete(X, Y, H) operator to $P^c$, wherein $$Score_{increase} = s(Y, \{NA_{Y,X} \backslash H\} \cup Pa_Y^{-X}) - s(Y, \{NA_{Y,X} \backslash H\} \cup Pa_Y)$$

where $Pa_Y$ denotes parents of node Y in $P^c$; and $Pa_Y^{-X}$ denotes $Pa_Y \backslash \{X\}$.

41. The method of claim 29, the at least one operator further comprising an edge reversal operator that, when validly applied to a directed edge in the state representation, reverses the directed edge.

42. The method of claim 29, the at least one operator further comprising at least one Meek operator.

43. The method of claim 29, the searching further comprising employing a predetermined scoring function having a decomposable scoring criterion for each of the at least one operator in the search space to compute a change in score associated with applying the at least one operator to the state representation.

44. The method of claim 43, the scoring function being defined to enable the computation of the score to occur without applying the at least one operator to the state representation.

45. The method of claim 43, further comprising:
prior to computing the score for the at least one operator, determining if the respective operator is valid for the state representation; and using the predetermined scoring function to compute the score for the respective operator based on determining that the operator is valid.

46. The method of claim 29, further comprising selecting an operator to apply to the state representation based on the score associated with the selected operator and applying the selected operator to change the representation to a next state representation corresponding to a non-empty equivalence class.

47. The method of claim 29, the state representation comprising a completed partially directed acyclic graph (PDAG).

48. The method of claim 47, further comprising applying a selected operator to the state representation to provide a resulting PDAG that defines a non-empty equivalence class.

49. The method of claim 48, further comprising converting the resulting PDAG representation into a completed PDAG.

50. The method of claim 29, the at least one operator comprising a plurality of operators, the method further comprising:
efficiently generating a set of valid operators from the plurality of operators based on validity conditions associated with each of the respective operator in the plurality of operators; and
using the set of valid operators in the searching.

51. A computer-readable medium having computer-executable instructions for performing the method of claim 29.

52. A computer-implemented search system for generating a Bayesian network, comprising: *a model generator residing within a computer memory that generates and stores within the memory a highest-scoring Bayesian network structure by searching an E-space related to one or more of customer or product data, the network structure is produced by employing:*
a current equivalence-class state representation corresponding to a class of Bayesian network structures in a search space;
a set of at least one operator operative to transform the current state representation to a next state representation, the at least one operator having an associated validity condition that defines whether the at least one operator is valid for the current state representation; and
a scoring function that computes a local score associated with the at least one operator relative to the current state representation by employing a score-equivalent and decomposable scoring criteria and identifies an operator from the set of at least one operator that results in a maximum score for the current state representation, the identified operator is applied in generating the highest scoring structure based on results associated with searching the E-space.

53. The system of claim 52, further comprising a converter operative to convert the next state representation to another equivalence class representation thereof in the search space.

54. The system of claim 53, the current state representation comprising a completed partially directed acyclic graph (PDAG).

55. The system of claim 52, the next state representation corresponding to a resulting PDAG corresponding to a non-empty equivalence class, the converter being operative to convert the resulting PDAG into a completed PDAG.

56. The system of claim 52, the set of at least one operator further comprising a set of a plurality of operators, each of the plurality of operators being operative to transform the current state representation to a respective next state representation, each of the plurality of operators having an associated validity condition that defines whether each respective operator is valid for a given application to the current state representation.

57. The system of claim 56, the scoring system computing scores based on whether each respective operator is valid for a given application to the current state representation.

58. The system of claim 56, further comprising a validity system operative to ascertain the validity of each respective operator and generate a set of candidate operators for use by the scoring system based on the validity of the operators.

59. The system of claim 52, the set of at least one operator further comprising at least a reverse operator, the reverse operator being operative to reverse a directed edge in the current state representation, the reverse operator having an associated validity condition for controlling application to the current state representation.

60. The system of claim 52, the set of at least one operator further comprising at least one Meek operator.

61. The system of claim 52, the current state representation comprising at least two nodes and the set of at least one operator further comprising:
   a first insert operator for inserting an undirected edge between a pair of the at least two nodes;
   a first delete operator for deleting an undirected edge between a pair of the at least two nodes connected by an undirected edge;
   a second insert operator for inserting a directed edge between a pair of the at least two nodes;
   a second delete operator for deleting a directed edge between a pair of the at least two nodes connected by a directed edge;
   a reverse operator for reversing a directed edge between a pair of the at least two nodes connected by a directed edge; and
   a make-v operator for making a v-structure from a triple of nodes.

62. The system of claim 61, each of the operators in the set of operators having an associated validity condition that defines whether each respective operator is valid for a given application to the current state representation.

63. The system of claim 52, the current state representation comprising a completed partially directed acyclic graph $P^c$ having at least two nodes X and Y, the set of operators further comprising an Insert(X, Y, T) operator for adding an edge between a pair of the at least two nodes, where T is a subset of at least one neighbor of Y not adjacent to X.

64. The system of claim 63, the Insert(X, Y, T) operator being valid if (a) $NA_{Y,X} \cup T$ is a clique and (b) every semi-directed path from Y to X contains a node in $NA_{Y,X} \cup T$, where $NA_{Y,X}$ corresponds to a set of nodes that are neighbors of node Y and are adjacent to node X in $P^c$.

65. The system of claim 64, the scoring function being operative to compute an increase in score $Score_{increase}$ that results from applying the Insert(X, Y, T) operator to $P^c$, wherein $$Score_{increase} = s(Y, NA_{y,x} \cup T \cup Pa^{+X}) - s(Y, NA_{y,x} \cup T \cup Pa_y),$$

where $Pa_Y$ denotes parents of node Y in $P^c$; and $Pa_Y^{+X}$ denotes $Pa_Y \cup \{X\}$.

66. The system of claim 52, the current state representation comprising a completed partially directed acyclic graph $P^c$ having at least two nodes X and Y, and the set of at least one operator further comprising a Delete(X, Y, H) operator for deleting an edge in $P^c$, where H is a subset of at least one neighbor of Y adjacent to X.

67. The system of claim 66, the Delete(X, Y, H) operator being valid for deleting an edge between X and Y if $NA_{Y,X} \backslash H$ is a clique, where $NA_{Y,X}$ corresponds to a set of nodes that are neighbors of node Y and are adjacent to node X in $P^c$.

68. The system of claim 67, the scoring function being operative to compute an increase in score $Score_{increase}$ that results from applying the Delete(X, Y, H) operator to $P^c$, wherein $$Score_{increase} = s(Y, \{NA_{y,x} \backslash H\} \cup Pa_Y^{-X}) - s(Y, \{NA_{Y,X} \backslash H\} \cup Pa_Y)$$

where $Pa_Y$ denotes parents of node Y in $P^c$; and $Pa_Y^{-X}$ denotes $Pa_Y \backslash \{X\}$.

* * * * *

UNITED STATES PATENT AND TRADEMARK OFFICE
CERTIFICATE OF CORRECTION

PATENT NO. : 7,324,981 B2  
APPLICATION NO. : 10/147620  
DATED : January 29, 2008  
INVENTOR(S) : David Maxwell Chickering Page 1 of 1

It is certified that error appears in the above-identified patent and that said Letters Patent is hereby corrected as shown below:

In column 28, line 20, in Claim 5, delete "V operator" and insert -- v operator --, therefor.

In column 28, line 21, in Claim 5, delete "V-structure" and insert -- v-structure --, therefor.

Signed and Sealed this
Twenty-second Day of February, 2011

David J. Kappos
*Director of the United States Patent and Trademark Office*